United States Patent
Jin et al.

(10) Patent No.: US 9,202,278 B2
(45) Date of Patent: Dec. 1, 2015

(54) PLANE-BASED SELF-CALIBRATION FOR STRUCTURE FROM MOTION

(75) Inventors: Hailin Jin, San Jose, CA (US); Zihan Zhou, Urbana, IL (US)

(73) Assignee: Adobe Systems Incorporated, San Jose, CA (US)

(*) Notice: Subject to any disclaimer, the term of this patent is extended or adjusted under 35 U.S.C. 154(b) by 658 days.

(21) Appl. No.: 13/551,601

(22) Filed: Jul. 17, 2012

(65) Prior Publication Data

US 2013/0044186 A1 Feb. 21, 2013

Related U.S. Application Data

(60) Provisional application No. 61/525,622, filed on Aug. 19, 2011, provisional application No. 61/525,621, filed on Aug. 19, 2011.

(51) Int. Cl.
*G06K 9/00* (2006.01)
*G06T 7/00* (2006.01)
*G06T 7/20* (2006.01)

(52) U.S. Cl.
CPC ........... *G06T 7/0018* (2013.01); *G06T 7/20* (2013.01); *G06T 2207/30241* (2013.01)

(58) Field of Classification Search
CPC .......... G06T 2207/30241; G06T 7/20; G06T 7/0018; H04N 13/02
USPC ........................................................ 382/103
See application file for complete search history.

(56) References Cited

U.S. PATENT DOCUMENTS

| 5,598,515 | A | 1/1997 | Shashua |
| 6,014,473 | A | 1/2000 | Hossack et al. |
| 6,137,491 | A | 10/2000 | Szeliski |
| 6,192,145 | B1 | 2/2001 | Anandan et al. |
| 6,661,913 | B1 | 12/2003 | Zhang et al. |
| 6,859,549 | B1 | 2/2005 | Oliensis |
| 7,477,762 | B2 | 1/2009 | Zhang et al. |
| 7,831,090 | B1 | 11/2010 | Krishnan et al. |
| 8,320,620 | B1 | 11/2012 | Cohen |
| 8,885,887 | B1 | 11/2014 | Chen et al. |
| 9,153,025 | | 10/2015 | Jin et al. |
| 2006/0024041 | A1* | 2/2006 | Lou et al. ............. 396/213 |
| 2008/0232645 | A1 | 9/2008 | Billinghurst et al. |
| 2011/0175998 | A1 | 7/2011 | Azuma et al. |
| 2011/0310255 | A1* | 12/2011 | Medeiros et al. ........ 348/187 |

(Continued)

OTHER PUBLICATIONS

Myers,G.K. and Burns,B."A Robust Method for Tracking Scene Text in Video Imagery", CBDAR 2005,p. 30-35.*

(Continued)

*Primary Examiner* — Ali Bayat
(74) *Attorney, Agent, or Firm* — Wolfe-SBMC

(57) ABSTRACT

Robust techniques for self-calibration of a moving camera observing a planar scene. Plane-based self-calibration techniques may take as input the homographies between images estimated from point correspondences and provide an estimate of the focal lengths of all the cameras. A plane-based self-calibration technique may be based on the enumeration of the inherently bounded space of the focal lengths. Each sample of the search space defines a plane in the 3D space and in turn produces a tentative Euclidean reconstruction of all the cameras that is then scored. The sample with the best score is chosen and the final focal lengths and camera motions are computed. Variations on this technique handle both constant focal length cases and varying focal length cases.

20 Claims, 19 Drawing Sheets

(56) References Cited

U.S. PATENT DOCUMENTS

| | | |
|---|---|---|
| 2011/0311104 A1 | 12/2011 | Sinha et al. |
| 2013/0044913 A1 | 2/2013 | Jin |
| 2013/0279761 A1 | 10/2013 | Tytgat et al. |
| 2013/0335575 A1 | 12/2013 | Tsin et al. |
| 2014/0047367 A1 | 2/2014 | Nielsen |
| 2014/0212027 A1 | 7/2014 | Hallquist et al. |

OTHER PUBLICATIONS

"Non-Final Office Action", U.S. Appl. No. 13/551,603, Apr. 24, 2014, 15 pages.
Derpanis, "Overview of the RANSAC Algorithm", Available at <http://www.cse.yorku.ca/~kosta/CompVis_Notes/ransac.pdf>, May 13, 2010, 2 pages.
Zuliani, et al., "The MultiRANSAC Algorithm and Its Application to Detect Planar Homographies", IEEE International Conference on Image Processing, Sep. 2005, 4 pages.
Tsai, R. Y. and Huang, T.S. Estimating three-dimensional motion parameters of a rigid planar patch, II: singular value decomposition. IEEE Transactions on Acoustics, Speech and Signal Processing, vol. ASSP-30, pp. 525-534, Aug. 1982.
Weng, J., Ahuja, N., and Huang, T.S. Motion and Structure from Point Correspondences with Error Estimation: Planar Surfaces. IEEE Transactions on Signal Processing, 39(12), 1991, 27 pages.
Longuet-Higgins, H.C. The visual ambiguity of a moving plane. Proceedings of the Royal Society of London, 1984, 12 pages.
Waxman, A. M. and Wohn, K. Contour evolution, neighborhood deformation and global image flow: Planar surfaces in motion. International Journal of Robotics Research, 4(3), 1985, 15 pages.
Richard Szeliski and P. H. S. Torr. Geometrically Constrained Structure from Motion: Points on Planes. European Workshop on 3D Structure from Multiple Images of Large-Scale Environments (SMILE), 1998, 23 pages.
Bartoli, A. and Sturm, P. Constrained Structure and Motion From Multiple Uncalibrated Views of a Piecewise Planar Scene. International Journal on Computer Vision, 52(1), 2003, 42 pages.
Philip H. S. Torr, Andrew W. Fitzgibbon, and Andrew Zisserman. The problem of degeneracy in structure and motion recovery from uncalibrated image sequences. International Journal of Computer Vision, 32(1), 1999, 20 pages.
Marc Pollefeys, Frank Verbiest, and Luc Van Gool. Surviving dominant planes in uncalibrated structure and motion recovery. In Proceedings of European Conference on Computer Vision, 2002, 14 pages.
O. Chum, T. Werner, and J. Matas. Two-view geometry estimation unaffected by a dominant plane. In Proceedings of IEEE Conference on Computer Vision and Pattern Recognition, 2005, 8 pages.
Robert Kaucic, Nicolas Dano, and Richard Hartley. Plane-based projective reconstruction. In Proceedings of International Conference on Computer Vision, 2001, 8 pages.
Carsten Rother. Linear multi-view reconstruction of points, lines, planes and cameras, using a reference plane. In Proceedings of International Conference on Computer Vision, 2003, 8 pages.
C. Baillard and A. Zisserman. Automatic reconstruction of piecewise planar models from multiple views. In Proceedings of IEEE Conference on Computer Vision and Pattern Recognition, 1999, 7 pages.
Friedrich Fraundorfer, Konrad Schindler, and Horst Bischof. Piecewise planar scene reconstruction from sparse correspondences. Image and Vision Computing, 24(4), 2006, 12 pages.
Kanazawa, Y. and Kawakami, H. Detection of planar regions with uncalibrated stereo using distributions of feature points. In British Machine Vision Conference (BMVC), Kingston upon Thames, London, Sep. 2004, vol. 1, pp. 247-256.
Piazzi, J. and Prattichizzo, D. Plane Detection with stereo images. In International Conference Robotics and Automation, 2006, 6 pages.
Vincent, E. and Laganiere, R. Detecting planar homographies in an image pair. In International Symposium on Image and Signal Processing and Analysis, 2001, 6 pages.
Lopez-Nicolas, G., Guerrero, J.J., Pellejero, O.A., and Sagues, C. Computing homographies from three lines or points in an image pair. In ICIAP'05 Proceedings of the 13th international conference on Image Analysis and Processing, pp. 446-453 (2005).
David F. Fouhey, Daniel Scharstein, and Amy J. Briggs. Mulitple plane detection in image pairs using j-linkage. In Proc. 20th International Conference on Pattern Recognition (ICPR 2010), Istanbul, Turkey, Aug. 2010, 4 pages.
Manolis I.A. Lourakis, Antonis A. Argyros and Stelios C. Orphanoudakis. Detecting planes in an uncalibrated image pair. In Proc. BMVC'02, vol. 2, 2002, pp. 587-596 (2002).
Johann Prankl, Michael Zillich, Bastian Leibe, and Markus Vincze. Incremental model selection for detection and tracking of planar surfaces. In Proceedings of British Machine Vision Conference, 2010, 1 page.
Benoit Bocquillon, Pierre Gurdjos, and Alain Crouzil. Towards a guaranteed solution to plane-based selfcalibration. In ACCV, pp. 11{20, 2006, 11 pages.
Riccardo Gherardi and Andrea Fusiello. Practical autocalibration. In ECCV, 2010, 12 pages.
P. Gurdjos and P. Sturm. Method and Geometry for plane-based self-calibration. In CVPR, 2003, 6 pages.
Y. Ma, J. Kosecka, S. Soatto, and S. Sastry. An Invitation to 3-D Vision, From Images to Models. Springer-Verlag, New York, 2004, 338 pages.
Ezio Malis and Roberto Cipolla. Camera self-calibration from unknown planar structures enforcing the multiview constraints between collineations. PAMI, 24(9):1268-1272, 2002.
J. F. Menudet, J. M. Becker, T. Fournel, and C. Mennessier. Plane-based camera self-calibration by metric rectification of images. Image and Vision Computing, 26:913-934, Jul. 2008.
Peter F. Sturm and Stephen J. Maybank. On plane-based camera calibration: A general algorithm, singularities, applications. In CVPR, pp. 432-437, 1999.
Bill Triggs. Autocalibration from planar scenes. In Proceedings of European Conference on Computer Vision (ECCV), 1998, 20 pages.
U.S. Appl. No. 13/551,603, filed Jul. 17, 2012, Hailin Jin, et al.
"Final Office Action", U.S. Appl. No. 13/551,603, Sep. 2, 2014, 17 pages.
Simon, et al., "Markerless Tracking using Planar Structures in the Scene", Proceedings. IEEE and ACM International Symposium on Augmented Reality, Sep. 2000, pp. 120-128.
"Non-Final Office Action", U.S. Appl. No. 13/551,603, Mar. 13, 2015, 14 pages.
"Notice of Allowance", U.S. Appl. No. 13/551,603, May 22, 2015, 6 pages.
Myers,"A Robust Method for Tracking Scene Text in Video Imagery", First International Workshop on Camera-Based Document Analysis and Recognition, Seoul, Korea, Aug. 2005, 6 pages.
"Corrected Notice of Allowance", U.S. Appl. No. 13/551,603, Jul. 8, 2015, 2 pages.

\* cited by examiner

Table 1

| Solution 1 | $R_1 = W_1 U_1^T$<br>$n_1 = \tilde{v}_2 u_1$<br>$\tilde{t}_1 = (H - R_1) n_1$ |
|---|---|
| Solution 2 | $R_2 = W_2 U_2^T$<br>$n_2 = \tilde{v}_2 u_2$<br>$\tilde{t}_2 = (H - R_2) n_2$ |
| Solution 3 | $R_3 = R_1$<br>$n_3 = -n_1$<br>$\tilde{t}_3 = -\tilde{t}_1$ |
| Solution 4 | $R_4 = R_2$<br>$n_4 = -n_2$<br>$\tilde{t}_4 = -\tilde{t}_2$ |

FIG. 9

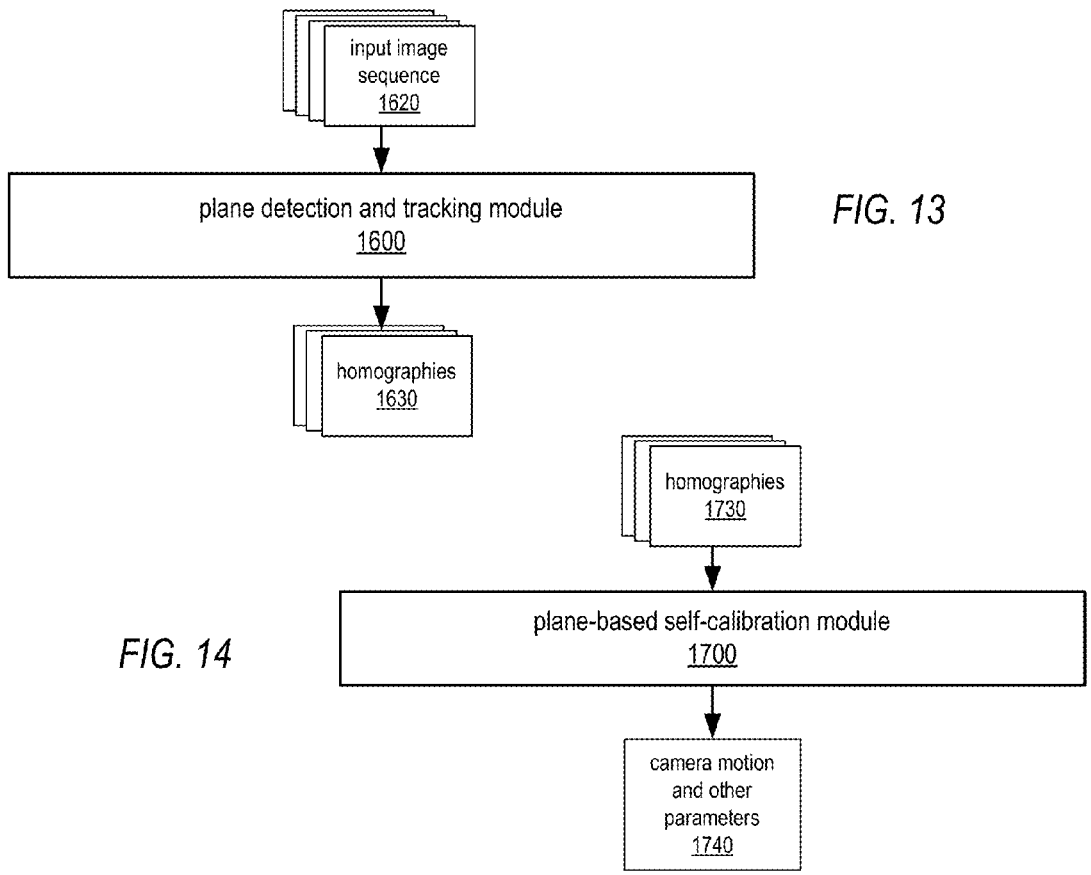
FIG. 13
FIG. 14
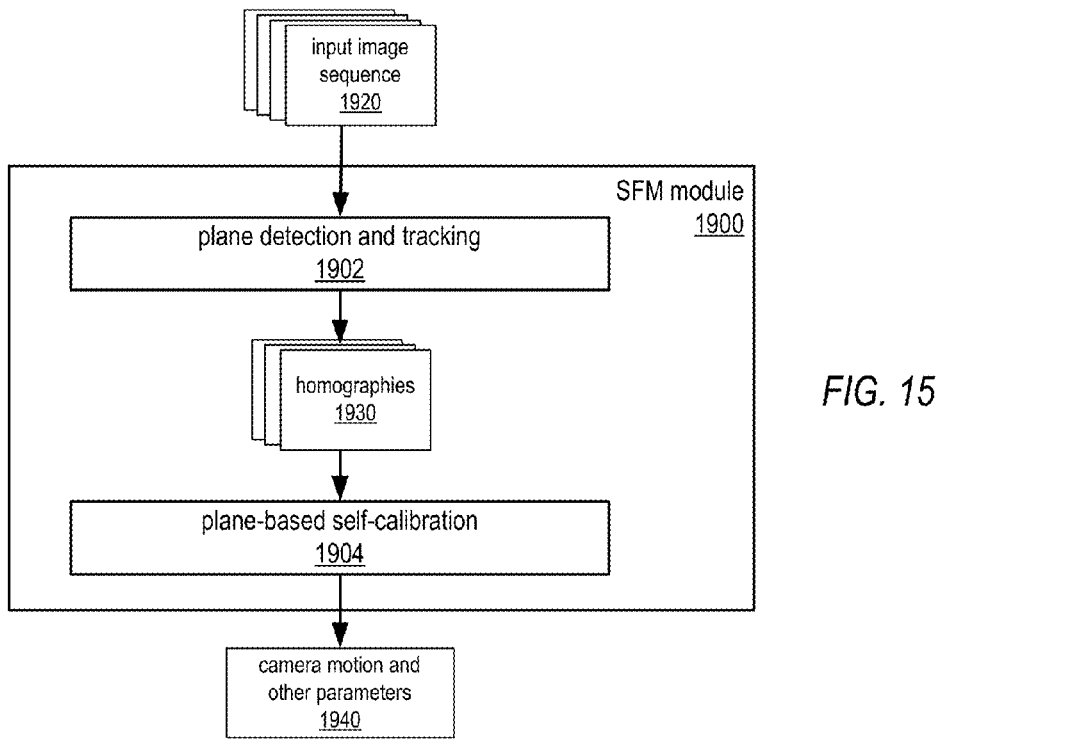
FIG. 15

US 9,202,278 B2

PLANE-BASED SELF-CALIBRATION FOR STRUCTURE FROM MOTION

PRIORITY INFORMATION

This application claims benefit of priority of U.S. Provisional Application Ser. No. 61/525,622 entitled "Plane-based Self-Calibration Techniques" filed Aug. 19, 2011, the content of which is incorporated by reference herein in its entirety, and to U.S. Provisional Application Ser. No. 61/525,621 entitled "Plane-based Structure from Motion" filed Aug. 19, 2011, the content of which is incorporated by reference herein in its entirety.

BACKGROUND

Description of the Related Art

In computer vision, inferring three-dimensional (3D) rigid-body motions of a moving camera from a video or set of images is a problem known as Structure from Motion (SFM). Obtaining a Structure from Motion (SFM) algorithm is of importance because a successful SFM algorithm would enable a wide range of applications in different domains including 3D image-based modeling and rendering, video stabilization, panorama stitching, video augmentation, vision based robot navigation, human-computer interaction, etc.

A problem in conventional SFM algorithms is in cases where there are multiple views of a scene with a dominant plane (e.g., a video or set of images that include planar or near-planar scenes). Conventional SFM approaches often assume that the unknown structures to be recovered are general, and hence tend to break down in these degenerative cases of planar or near-planar scenes. However, planar or near-planar scenes are common, for example in both indoor and outdoor man-made environments, in aerial photos, and in other environments.

SUMMARY

Various embodiments of methods and apparatus for performing structure from motion (SFM) are described. Plane-based SFM techniques are described that may be applied, for example, to find the three-dimensional (3D) structures of a static scene, for example from a video taken by a moving video camera or from a set of images taken with a still camera. In contrast to conventional SFM techniques, the SFM techniques described herein are generally based on a single dominant scene plane.

Embodiments of robust techniques for self-calibration of a moving camera observing a planar scene are described. These techniques may be referred to as plane-based self-calibration techniques. Embodiments of the plane-based self-calibration techniques may take as input a set of homographies between images, for example inter-image homographies estimated from point correspondences. Each homography represents a projective transformation from one image to another image. The plane-based self-calibration techniques provide as output an estimate of intrinsic parameters (e.g., focal lengths) for all the cameras, and may also provide 3D camera motion information (rotation and translation) as well as plane normal information. Thus, embodiments may take as input a projective reconstruction (the set of inter-image homographies) for an image sequence and generate as output a Euclidian reconstruction for the image sequence.

The plane-based self-calibration techniques may be based on the enumeration of the inherently bounded space of the focal lengths. Each sample of the focal length search space defines a plane in the 3D space and in turn produces a tentative Euclidean reconstruction of all the cameras that is then scored. The sample with the best score is chosen and the final focal lengths and camera motions are computed. Variations on this technique are described for handling both constant focal length cases and varying focal length cases.

BRIEF DESCRIPTION OF THE DRAWINGS

FIG. 9 shows a table of solutions to a planar homography decomposition, according to at least some embodiments.

FIG. 13 illustrates a plane detection and tracking module, according to at least some embodiments.

FIG. 14 illustrates a plane-based self-calibration module, according to at least some embodiments.

FIG. 15 illustrates an example SFM module that implements embodiments of a plane detection and tracking method and of a plane-based self-calibration method.

Figure 1:
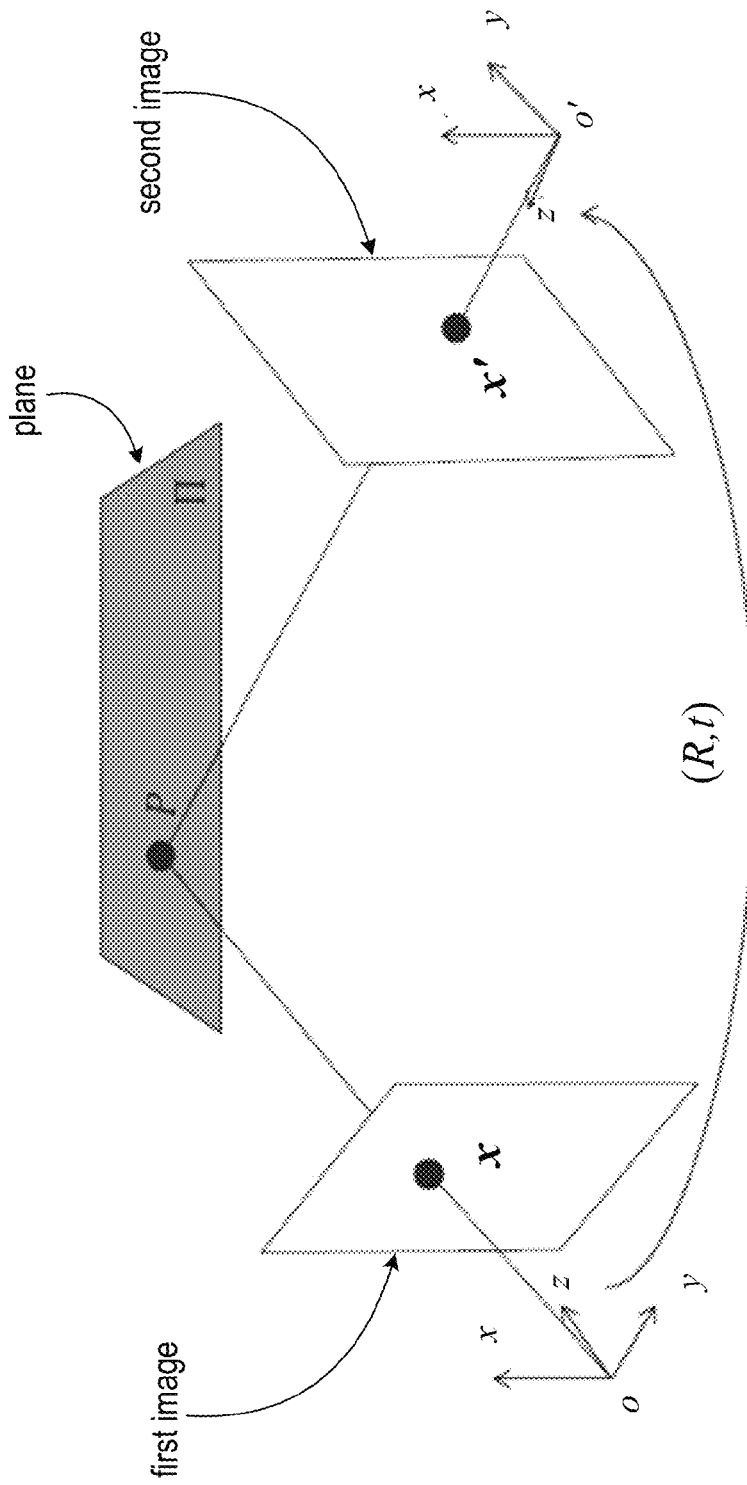
FIG. 1 illustrates homography induced by a plane, and introduces three-dimensional (3D) geometry, terms, and concepts.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for performing structure from motion (SFM) are described. Embodiments of robust techniques for computing 3D camera motion of a moving camera with unknown intrinsic parameters from multiple images of a scene that contains one or more planes are described. These SFM techniques may be applied, for example, to find the three-dimensional (3D) structures of a static scene, for example from a video taken by a moving video camera or from a set of images taken with a still camera. In contrast to conventional SFM techniques, the SFM techniques described herein are based on a single dominant scene plane. The SFM techniques include robust plane detection and tracking techniques, and efficient plane-based self-calibration techniques. The SFM techniques are highly complementary to conventional general purpose SFM systems. Embodiments of the plane-based SFM algorithms may detect planar regions across the entire sequence. The plane-based SFM algorithm works for both constant and varying focal lengths. Embodiments of the plane-based SFM algorithm may in addition recover 3D structure of the non-planar parts of the scene. Embodiments of the plane-based SFM algorithm may solve the SFM problem using information provided by the dominant plane. Embodiments of the plane-based SFM algorithm may be complimentary to existing general purpose SFM methods. Embodiments of the plane-based SFM algorithm may easily handle cases that are too challenging for conventional SFM systems. Embodiments of the plane-based SFM algorithm may provide fast, stable initialization.

Embodiments of robust techniques for detecting and tracking a plane across multiple images of a scene that contains one or more planes are described. These techniques may be referred to as plane detection and tracking techniques. Embodiments of the plane detection and tracking techniques may take point trajectories as input and provide as output a set of inter-image homographies. Embodiments of the plane detection and tracking techniques may detect and track planar regions across the entire sequence. The inter-image homographies may, for example, be used to generate estimates for 3D camera motion, camera intrinsic parameters, and plane normals using a plane-based self-calibration technique as described herein.

Embodiments of robust techniques for self-calibration of a moving camera observing a planar scene are also described. These techniques may be referred to as plane-based self-calibration techniques. Embodiments of the plane-based self-calibration techniques may take as input the homographies between images estimated from point correspondences and provide an estimate of the focal lengths of all the cameras. A plane-based self-calibration technique may be based on the enumeration of the inherently bounded space of the focal lengths. Each sample of the search space defines a plane in the 3D space and in turn produces a tentative Euclidean reconstruction of all the cameras which is then scored. The sample with the best score may be chosen, and the final focal lengths and camera motions are computed. Variations on this technique are described for handling both constant focal length cases and varying focal length cases. Algorithms are described that implement variations of this technique that may be applied to both constant and varying focal lengths.

While the plane-based SFM techniques are described herein primarily in the context of performing the techniques on sequences of frames in videos, note that the techniques may also be applied to any sets of images on which SFM may need to be performed, for example sequences of images shot with a digital camera and/or sequences of images shot with a conventional film camera and later digitized. Also note that, while embodiments are describe specifically for processing video or image sequences in which there is a dominant 2D plane, embodiments may be applied to sequences that do not specifically include an obvious dominant 2D plane, e.g. a set of images that include a cluttered desktop. In such cases, an approximation of a 2D plane may be derived from the point trajectories and used to generate an initial motion. The 2D plane assumption may then be relaxed to generate a final, refined result.

Robust Plane Detection and Tracking Techniques

Embodiments of plane-based SFM techniques are described that may address the problem of structure from motion (SFM) from multiple views of a scene where a dominant plane is present. Conventional SFM approaches often assume that the unknown structures to be recovered are general, and hence may break down in this degenerative case. Unfortunately, the planar scene case is a situation that is hard to avoid in many video and photography environments, including but not limited to indoor and outdoor man-made environments, aerial photos, and others. Embodiments of the plane-based SFM algorithms may provide methods for reconstructing planar or near-planar scenes by robustly detecting and tracking planes and directly analyzing their geometry. Furthermore, embodiments of the plane-based SFM algorithms may be applied to enhance the performance of existing SFM systems.

SFM aims to find the 3D structures of a static scene, for example from a video taken by a camera moving around it. For example, a photographer may take a lot of pictures while walking on the Great Wall of China, or in some other similar environment. Later, the photographer may want to reconstruct the 3D scene as well as determine where the images are taken, potentially without knowing anything about the camera such as its focal length. In cases like this, the photographer needs a solution to the SFM problem.

To reconstruct the 3D from the images, a method first needs to connect all the images together. This can be done, for example, by detecting, matching and tracking feature points over the entire sequence, such as corner features or SIFT features. Each detected feature now corresponds to a point trajectory over time. Note that the point trajectories may appear or disappear at any time and usually only span a subsequence of the entire video or image sequence. These trajectories serve as the input to most conventional SFM systems, and are also used as input to embodiments of the plane-based SFM techniques described herein.

Conventional SFM methods, as noted above, start with a set of feature points and/or trajectories, for example using SIFT features. Then, two or three frames are carefully selected to initialize the structure and motion recovery. This leads to the first projective reconstruction. Then, additional views are added into the reconstruction in an incremental fashion. For example, at each iteration, a view with the largest number of matches with the current view may be found. At some point, camera calibration may be performed. By that time, the rotation and translation of each camera (i.e., each image) may be recovered with regard to some world coordinate system. While this procedure is quite general, assumptions are made for it to work well. In particular, the conventional SFM techniques assume a general structure. However, as previously noted, these conventional techniques may fail in at least some cases, for example when images are dominated by planar or near-planar structure. Since these conventional methods generally depend on feature trajectories that are based on feature points of 3D objects, they tend to not do well or fail completely in such cases, as there may not be enough 3D information in the image(s) to provide the necessary feature points for generating point trajectories.

Problem Formulation

FIG. 1 illustrates homography induced by a plane, and introduces three-dimensional (3D) geometry, terms, and concepts used to formulate the problem. Consider two images of a point P on a plane PI (Π) in the 3D space. Assume the world coordinate system is associated with the left camera, and the plane equation can be written as show, where n is a 3*1 unit normal vector and d is the distance from the plane to the origin. Now, suppose the left and right frames are related by a 3*3 rotation matrix R and a 3*1 translation vector t; then the coordinate transformation between the two frames can be written as:

$$n^T X = d \Rightarrow \frac{1}{d} n^T X = 1$$

$$X' = RX + t = RX + t\frac{1}{d} n^T X = \left(R + \frac{1}{d} t n^T\right) X$$

P is projected to x and x' in the first and second images, respectively. The map from x to x' is the homography induced by the plane PI (Π):

$$x \cong KX, x' \cong K'X'$$

$$\Rightarrow x' \cong K'\left(R + \frac{1}{d} t n^T\right) K^{-1} x = Hx$$

$\cong$ : equality up to scale

The point correspondence between two images can be modeled as a homography. A homography thus represents the projective transformation from one image to another image. A homography H may be represented as a 3*3 matrix. Note that H can only be recovered up to some scale, and may have eight (8) degrees of freedom in total. Each two-dimensional (2D) point correspondence imposes two constraints on H via the equation x'=Hx, and it can be inferred that four such 2D-to-2D correspondences from points on the plane ($x_i \leftrightarrow x'_i$, i=1, 2, 3, 4) are sufficient to determine the homography up to scale.

Suppose that a planar scene is viewed by N cameras. $K_i \in \square^{3 \times 3}$ may be used to denote the intrinsic matrix of the i-th camera. Without loss of generality, the world coordinate frame may be chosen to be the camera frame of the first camera, and $R_i \in SO(3)$ and $t_i \in \square^3$ may be used to denote the Euclidean transformation from the world coordinate frame to the i-th camera frame. Note that $[R_1, t_1]=[I, 0]$ by definition.

For the scene structure, it may be assumed that the world plane π has coordinates π=(n, d)T with respect to the world coordinate frame, where $n^T$ is the unit normal vector and d>0 denotes the distance from the plane to the world origin. Therefore, for any point $X \in \square^3$ on the plane, $n^T X = d$.

Consider a situation in which a set of trajectories $$T = \{T_j\}_{j=1}^M$$

of M feature points on π are observed. For each $T_j$, let $p_j$ and $q_j$ ($1 \leq p_j \leq q_j \leq N$) denote the starting and ending frames, respectively. The following can be formulated:

$$T_j = \{x_j^i\}_{i=p_j}^{q_j},$$

where $x_j^i \in P^2$ are the homogeneous coordinates of the j-th point as seen by the i-th camera. The coordinates of the first frame and the i-th frame are related by a planar homography $x_j^i = H_i x_j^1$ where $H_i$ can be written as:

$$H_i \square K_i (R_i + t_i n^T / d) K_1^{-1}, \quad (A1)$$

with the symbol $\square$ indicating "equality up to a scale."

Since the translation parameters can only be recovered up to some unknown scale factor $\tilde{t} = t_i / d$, a goal of the plane-based SFM algorithm can be stated as finding all the unknown camera parameters $\{K_i, R_i, \tilde{t}_i\}_{i=1}^N$, the plane normal n and the scene points, given the 2D trajectories $\{T_j\}_{j=1}^M$ on the images.

Robust Plane Detection and Tracking Method

If all the tracked points belong to the same scene plane, the epipolar geometry (fundamental matrix) cannot be uniquely determined; thus, most conventional SFM methods would fail on such sequences. Embodiments of a plane-based SFM method as described herein may provide a complete system for uncalibrated SFM that can handle planar or near-planar scenes.

A key idea is that if the inter-plane homographies $\{H_i\}_{i=1}^N$ (also referred to herein as inter-image homographies, or just homographies) can be reliably estimated, then both camera parameters and scene structures can be accurately computed using a plane-based self-calibration method, for example as described in the section titled Robust plane-based self-calibration techniques. However, estimating the homographies from those trajectories is not a straightforward task. First, some of the trajectories may come from an outlying object off the plane, such as a person walking on the ground. In certain frames, the number of outlying trajectories may even be much larger than the number of inliers. Second, plane transition (change of dominant plane) may occur at any time over the sequence.

A RANSAC-based algorithm for robust reconstruction when a single dominant plane covers the entire sequence is described. In addition, it is shown how this method can be extended to handle plane transitions.

RANSAC is an abbreviation for "RANdom SAmple Consensus". RANSAC is an iterative method to estimate parameters of a mathematical model from a set of observed data that contains outliers. The RANSAC algorithm is a non-deterministic algorithm in the sense that it produces a reasonable result only with a certain probability, with this probability increasing as more iterations are allowed. A basic assumption is that the data consists of "inliers", i.e., data whose distribution can be explained by some set of model parameters, and "outliers" which are data that do not fit the model. In addition to this, the data can be subject to noise. The outliers can come, for example, from extreme values of the noise or from erroneous measurements or incorrect hypotheses about the interpretation of data. The RANSAC algorithm also assumes that, given a (usually small) set of inliers, there exists a procedure that can estimate the parameters of a model that optimally explains or fits this data.

Figure 3:
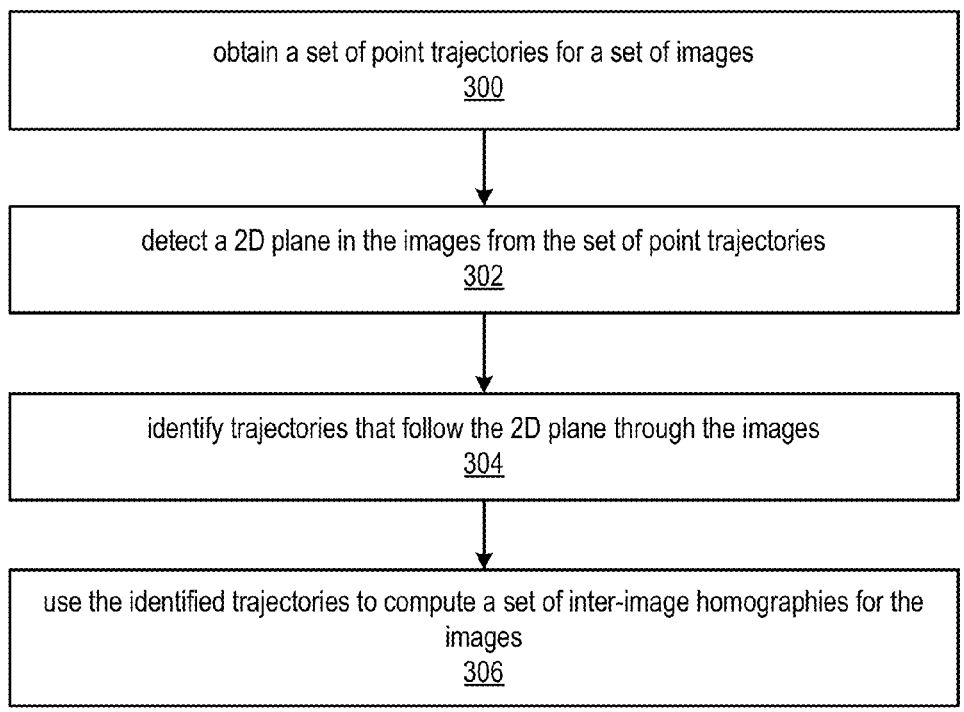
FIG. 3 broadly illustrates a plane detection and tracking method that takes as input a set of point trajectories and outputs a set of homographies, according to at least some embodiments.

FIG. 3 broadly illustrates a general plane detection and tracking method that takes as input a set of point trajectories and outputs a set of inter-image homographies, according to at least some embodiments. As indicated at 300, a set of point trajectories for a set of images (e.g., a video sequence, or a set of still photographs) may be obtained. As indicated at 302, a 2D plane in the images is detected from the point trajectories. As indicated at 304, trajectories that follow the 2D plane through the images may be identified. As indicated at 306, the identified trajectories may be used to compute a set of inter-image homographies for the images. Note that the output homographies may, but do not necessarily, cover the entire set of images.

The general method of FIG. 3 and variations thereof are described in more detail below.

RANSAC-Based Plane Detection and Tracking

Given N frames of a scene $\{F_i\}_{i=1}^N$, let $T^{ab} = \{T_j \in T : p_j \leq a, q_j \geq b\}$ be the set of trajectories which span the a-th and b-th frames. N−1 pairs of adjacent frames are formed: C={(F1, F2), (F2, F3), ..., $(F_{N-1}, F_N)$}. A straightforward technique for plane detection is to estimate the homography between each pair separately, where a RANSAC-based algorithm is used to handle outliers. This algorithm is described below as algorithm 1. Note that this algorithm is not intended to be limiting.

Algorithm 1 (Plane Detection Via Two-frame Homography Estimation)

01: Input: A set of M trajectories T over N frames. A RANSAC distance threshold E.
02: for 2≤i≤N
03: repeat for n trials: (RANSAC robust estimation of $H_{(i-1)i}$)
04: Select a random sample of four (4) point correspondences between the pair $(F_{(i-1)}, F_i)$ and compute the homography $H_{(i-1)i}$.
05: For each $T_j \in T^{(i-1)i}$, compute the distance $dist_j = dist(x_j^i, H_{(i-1)i} x_j^{(i-1)})$.
06: Compute the number of inliers consistent with $H_{(i-1)i}$ by the number of trajectories for which $dist_j \leq E$.
07: end repeat
08: Choose the $H_{(i-1)i}$ with the largest number of inliers.
09: end for
10: Compute the homography between the first and the i-th frame recursively using $\{H_{(i-1)i}\}_{i=2}^N$:

$$H_1 = I_{3 \times 3}, H_i = H_{(i-1)i} H_{(i-1)}, i=2, \ldots, N.$$

11: Output: A set of inter-image homographies $\{H_i\}_{i=1}^N$.

Figure 4:
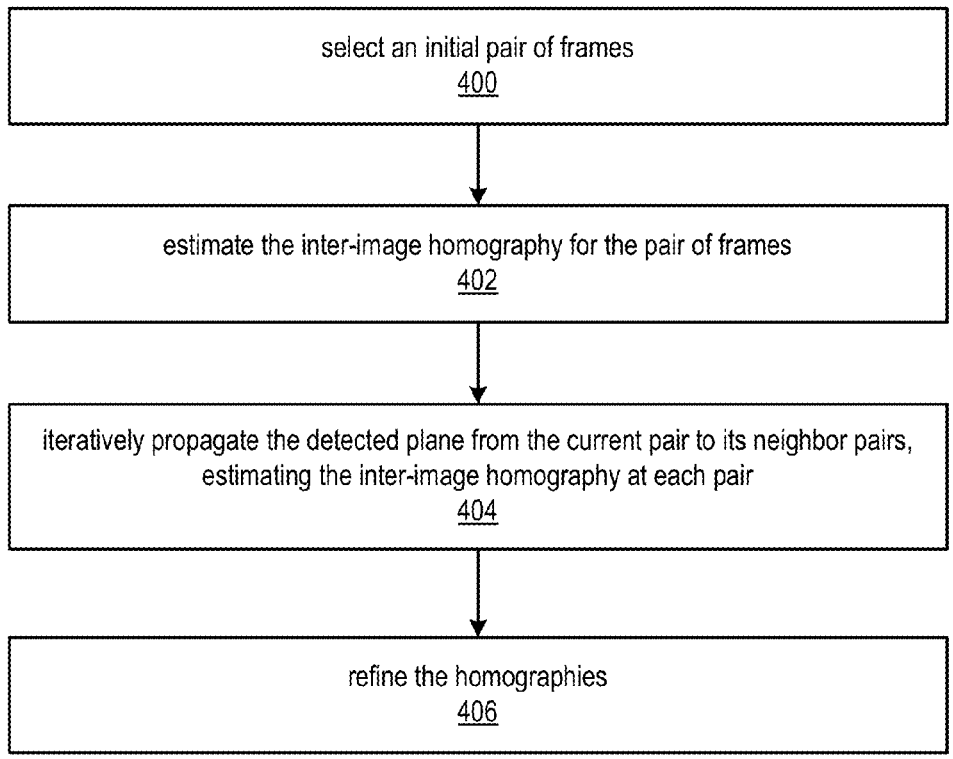
FIG. 4 is a high-level flowchart of a RANSAC-based plane detection and tracking algorithm, according to at least some embodiments.

A drawback of such a method is that it may fail on image pairs in which the percentage of outliers is high (e.g., >50%), due to the fact that all point correspondences between the image pair are used for RANSAC sampling. To overcome this difficulty, a RANSAC-based plane detection and tracking algorithm is described that can detect the plane even in the frames in which the outliers dominate. FIG. 4 is a high-level flowchart of this algorithm.

As indicated at 400, a pair of frames is selected from an image sequence. The inter-image homography is estimated for the pair of images, as indicated at 402. In at least some embodiments, the algorithm starts with any pair in C and estimates the inter-image homography using a RANSAC-based algorithm. As indicated at 404, the algorithm then iteratively propagates the detected plane from the current frame pair to its neighbors in C, where two pairs are neighbors if they share a common frame. The inter-image homography is estimated at each pair according to the RANSAC-based algorithm. In at least some embodiments, except for the first pair of frames, only the inlying trajectories (also referred to herein as inliers) propagated from the previously processed frames are used as candidates for RANSAC sampling and for estimating the homography, which may result in a more robust algorithm to outliers (outlying trajectories) than algorithm 1.

As indicated at 406 of FIG. 4, in at least some embodiments, the homographies may be refined. In at least some embodiments, once the estimates of $\{H_i\}_{i=1}^N$ and the set of inliers $T_{in}$ are obtained, the homographies may be refined using a nonlinear program technique which minimizes the geometric errors for all trajectories in $T_{in}$:

$$\min_{x_j, H_i} \sum_{j: T_j \in T_{in}} \sum_{i=p_j}^{q_j} dist(x_j^i, H_i x_j)^2, \quad (A2)$$

where $dist(x_j^i, H_i x_j)$ is defined as the Euclidean image distance in the i-th image between the measurement point $x_j^i$ and the point $H_i x_j$ at which the corresponding point $x_j$ is mapped from the first image. Note that $x_j$ is used as the variable in equation (A2) in order to differentiate it from $x_j^1$, which represents the measured 2D feature point coordinates in the first frame.

Details of this RANSAC-based plane detection and tracking algorithm are given in algorithm 2, which is not intended to be limiting. Note that the order of steps 3 and 4 may be switched by first selecting a random sample of four (4) trajectories and then selecting a frame pair that is shared by all the trajectories. However, in practice it may be more efficient to first sample the frame pairs, as many trajectories do not share any frame.

Algorithm 2 (RANSAC-Based Plane Detection and Tracking Algorithm)

01: Input: A set of M trajectories T over N frames. A RANSAC distance threshold E.
02: repeat for n trials: (RANSAC robust plane detection)
03: Select a random pair of frames $(F_{i-1}, F_i)$ from C. Set $C_p = \{(F_{i-1}, F_i)\}$.
04: Select a random sample of four (4) trajectories from $T^{(i-1)i}$ and compute the homography $H_{(i-1)i}$.
05: For each $T_j \in T^{(i-1)i}$, compute the distance $dist_j = dist(x_j^i, H_{(i-1)i} x_j^{i-1})$.
06: Partition $T^{(i-1)i}$ into inliers and outliers:

$T_{in} = \{T_j \in T^{(i-1)i}: dist_j \leq E\}, T_{out} = \{T_j \in T^{(i-1)i}: dist_j > E\}.$ 07: while $C_p \neq C$
08: Select a pair of frames $(F_{(i-1)}, F_i)$ from $C \setminus C_p$ such that one of its neighbors is in $C_p$. Set $C_p = C_p \cup \{(F_{(i-1)}, F_i)\}$.
09: Set $T_c^{(i-1)i} = T_{in} \cap T^{(i-1)i}$.
10: if $|T_c^{(i-1)i}| < 4$; break; end if
11: repeat for n trials: (RANSAC robust estimation of $H_{(i-1)i}$)
12: Select a random sample of four (4) trajectories from $T_c^{(i-1)i}$ and compute the homography $H_{(i-1)i}$.
13: For each $T_j \in T^{(i-1)i} \setminus T_{out}$, compute the distance $dist_j = dist(x_j^i, H_{(i-1)i} x_j^{(i-1)}).$ 14: Compute the number of inliers consistent with by the number of trajectories for which $dist_j \leq E$.
15: end repeat
16: Choose the with the largest number of inliers.
17: Partition all unclassified trajectories in T into inliers and outliers:

$T_{in} = T_{in} \cup \{T_j \in T^{(i-1)i} \setminus (T_{out} \cup T_{in}), dist_j \leq E\},$ $T_{out} = T_{out} \cup \{T_j \in T^{(i-1)i} \setminus (T_{out} \cup T_{in}), dist_j > E\}.$ 18: end while
19: end repeat
20: Choose the set of $\{H_{(i-1)i}\}_{i=2}^{N}$ from the trial with the largest number of inliers $|T_{in}|$.
21: Compute the homography between the first and the i-th frame recursively using $\{H_{(i-1)i}\}_{i=2}^{N}$:

$H_1 = I_{3 \times 3}, H_i = H_{(i-1)i} H_{i-1}, i = 2, \ldots, N.$

22: Optimal estimation: re-estimate $\{H_i\}_{i=1}^{N}$ from all trajectories classified as inliers, by minimizing equation (A2), for example using the Levenberg-Marquardt algorithm.
23: Output: A set of inter-image homographies $\{H_i\}_{i=1}^{N}$.

Figure 5A:
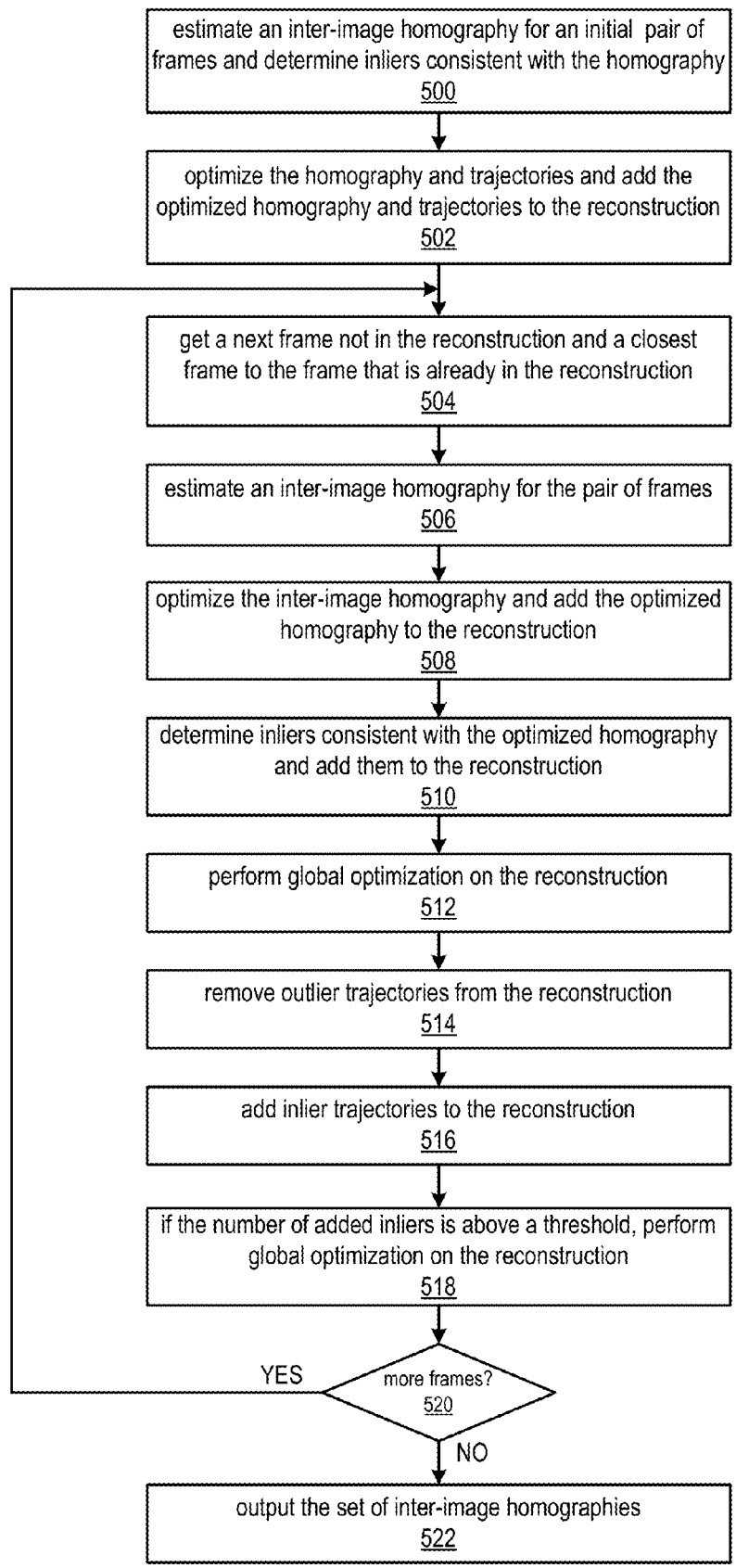
FIG. 5A is a flowchart of an alternative plane detection and tracking algorithm, according to at least some embodiments.

FIG. 5A is a flowchart of an alternative formulation for the RANSAC-based plane detection and tracking algorithm, according to at least some embodiments. This algorithm, like algorithm 2, estimates an inter-image homography for a first pair of frames in an image sequence, initializes the projective reconstruction for the image sequence with the homography for the first pair of frames, and then propagates the reconstruction to the remaining frames. However, this algorithm, after adding the homography and inlier trajectories for each subsequent frame to the projective reconstruction, performs a global optimization of the projective reconstruction, and then identifies and removes outlier trajectories from the projective reconstruction and identifies and adds inlier trajectories to the projective reconstruction. In at least some embodiments, if more than a threshold number of inliers are added, a second global optimization is performed. Elements 500 and 502 represent the initial pair reconstruction, and elements 504 through 520 represent an iterative process that propagates the reconstruction across the rest of the frames in the image sequence.

Figure 5B:
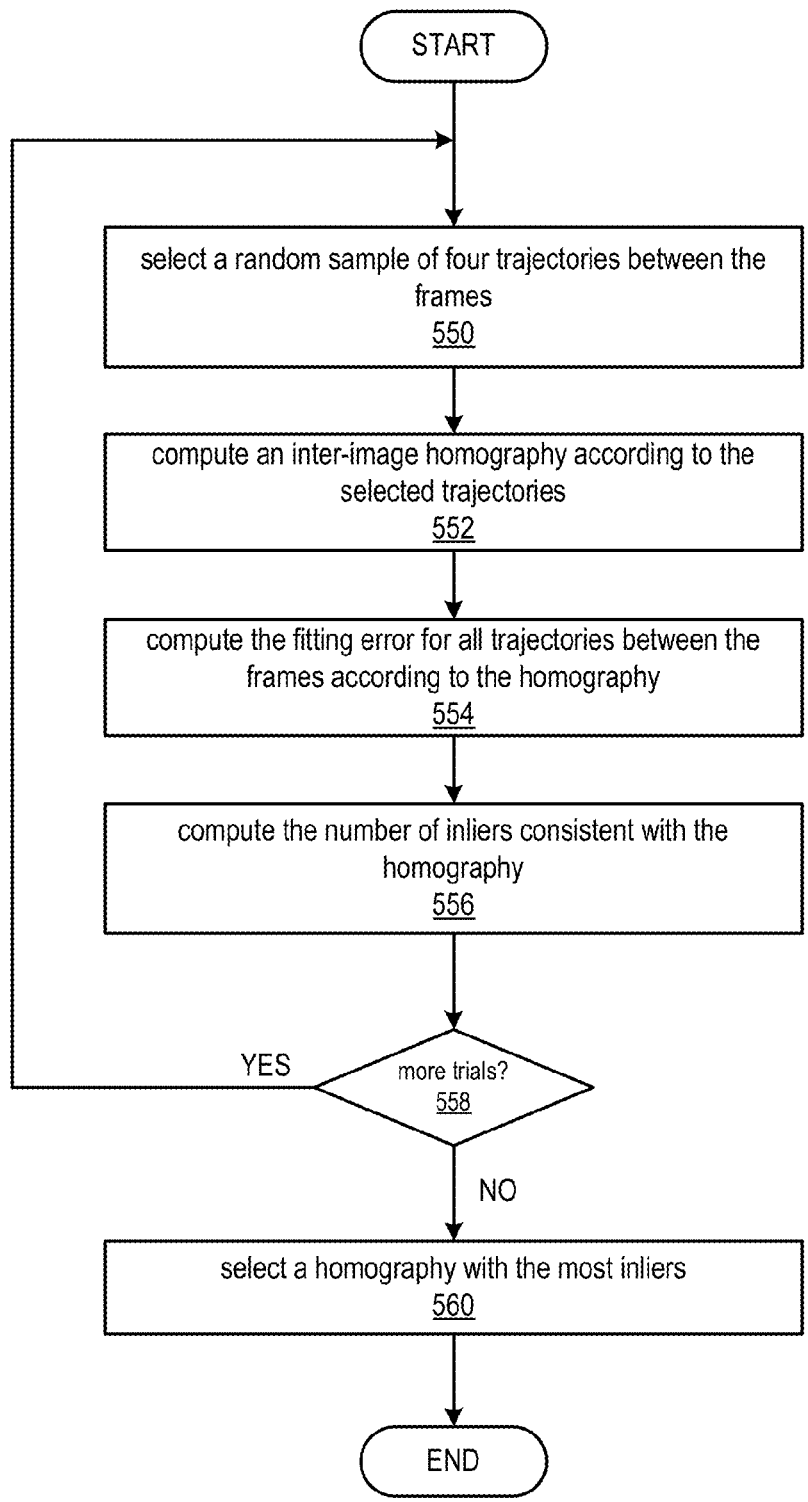
FIG. 5B is a flowchart of a method for estimating a homography for a pair of frames, according to at least some embodiments.

As indicated at 500 of FIG. 5A, an inter-image homography is estimated for an initial pair of frames selected from an image sequence, and inlier trajectories that are consistent with the homography are determined. FIG. 5B illustrates a method for estimating a homography for a pair of frames that may be used at element 500, in at least some embodiments. As indicated at 502, the estimated inter-image homography and trajectories may be optimized, for example according to a non-linear optimization technique, and the optimized homography and trajectories may be added to the projective reconstruction.

Elements 504 through 520 of FIG. 5A iteratively add frames that are not in the current reconstruction to the reconstruction. As indicated at 504, a next frame not in the current reconstruction is selected, and a closest frame to the selected frame that is already in the current reconstruction is found. As indicated at 506, an inter-image homography is computed for the pair of frames. In at least some embodiments, a method similar to the method illustrated in FIG. 5B may be used to compute the inter-image homography.

As indicated at 508 of FIG. 5A, the inter-image homography may be optimized, for example according to a non-linear optimization technique, and the optimized homography may be added to the current reconstruction. In at least some embodiments, the optimized homography may be added to the reconstruction by composing the optimized homography against a homography of the previously determined closest frame. In at least some embodiments, the homography of the closest frame against which the optimized homography is composed may be a homography with respect to a global reference frame. In at least some embodiments, the global reference frame may be one of the initial pair of frames from elements 500-502. In at least some embodiments, composing may be performed as a multiplication of the homographies: dH*H, where dH is the optimized homography between the current frame being processed and the closest frame and H is the homography between the closest frame and the global reference frame.

As indicated at 510 of FIG. 5A, inliers consistent with the optimized homography may be determined and added to the reconstruction. As indicated at 512, a global optimization may be performed on the reconstruction. The global optimization may involve jointly optimizing the homographies for all the frames and all of the trajectories.

As indicated at 514 of FIG. 5A, outlier trajectories may be identified and removed from the reconstruction. In at least some embodiments, the outlier trajectories to be removed may be identified as all trajectories for which the fitting error at a frame in the reconstruction is greater than a threshold.

As indicated at 516 of FIG. 5A, inlier trajectories may be identified and added to the reconstruction. In at least some embodiments, the inlier trajectories that are added may be identified by processing all of the trajectories that are not in the current reconstruction. Each of the trajectories not in the current reconstruction is reconstructed, and a fitting error is computed for the reconstructed trajectory in all the frames in the current reconstruction. Any of these frames for which the fitting error is below a threshold in all of the frames in the current reconstruction is determined to be an inlier trajectory, and is added to the current reconstruction.

As indicated at 518 of FIG. 5A, if the number of inliers added to the current reconstruction is above a threshold, then another global optimization may be performed on the current reconstruction.

At 520 of FIG. 5A, if there are more frames not in the current reconstruction, then the method returns to element 504 to get and process a next frame. Otherwise, the set of inter-image homographies, representing the projective reconstruction for the image sequence, is output, as indicated at 522.

FIG. 5B is a flowchart of a method for estimating a homography for a pair of frames, according to at least some embodiments. The method performs several trials to compute inter-image homographies for two input frames according to different sets of trajectories between the frames, scores each homography (e.g., by computing the number of inlier trajectories consistent with the homography), and then when the trials are done selects a homography with the best score (e.g., the homography with the most inliers). As indicated at 550, the method selects a random sample of four trajectories between the frames. As indicated at 552, an inter-image homography is computed according to the selected trajectories. As indicated at 554, a fitting error is computed for all trajectories between the frames according to the homography. As indicated at 556, the number of inliers consistent with the homography is computed. At 558, if more trials are to be performed, the method returns to 550. Otherwise, as indicated at 560, a homography with the most inliers is selected as the estimated homography for the pair of frames, and the estimated inter-image homography and inlier trajectories are output.

Figure 2A:
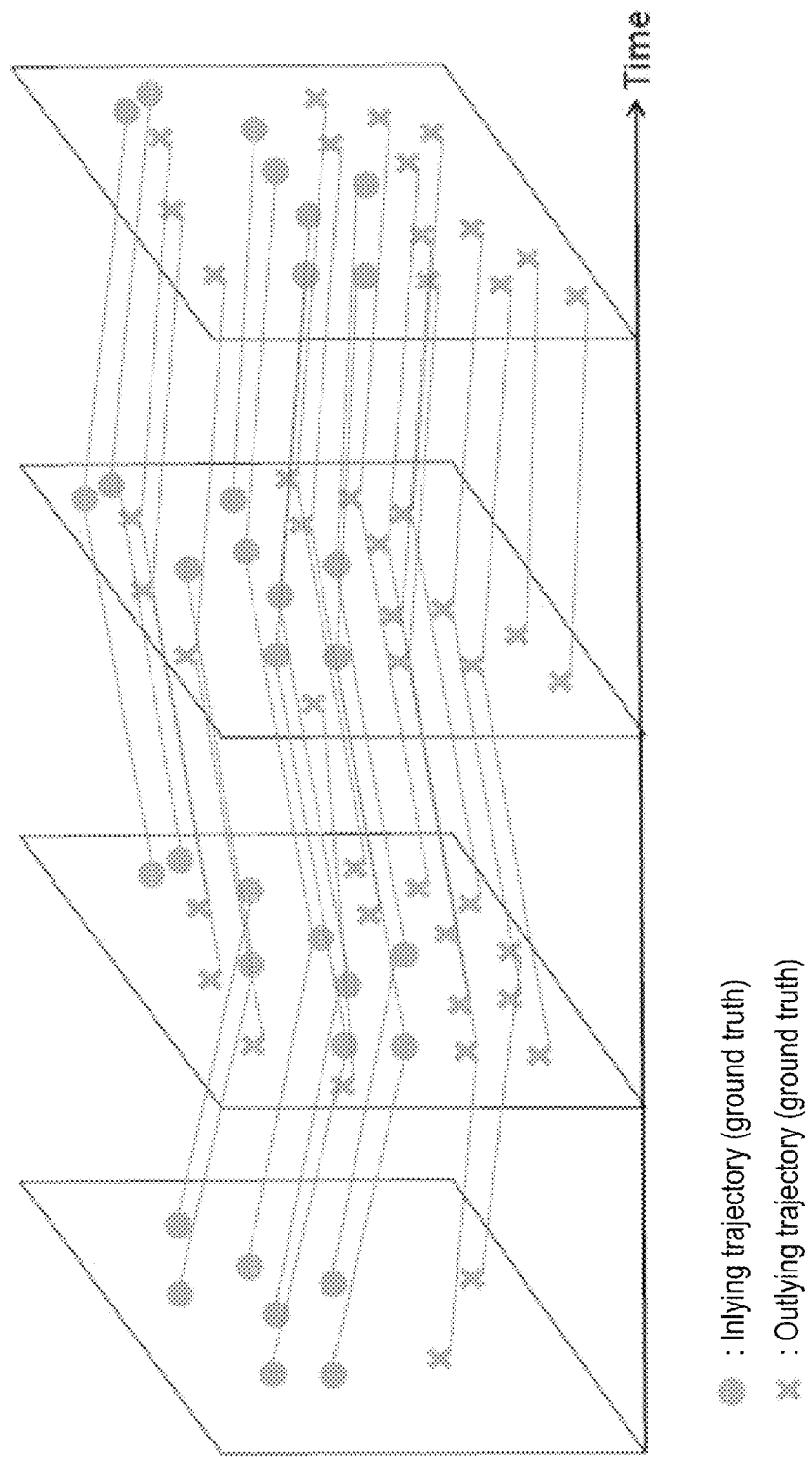
FIGS. 2A through 2G graphically illustrate a plane detection and tracking algorithm being applied to a set of four frames according to at least some embodiments.
Figure 2B:
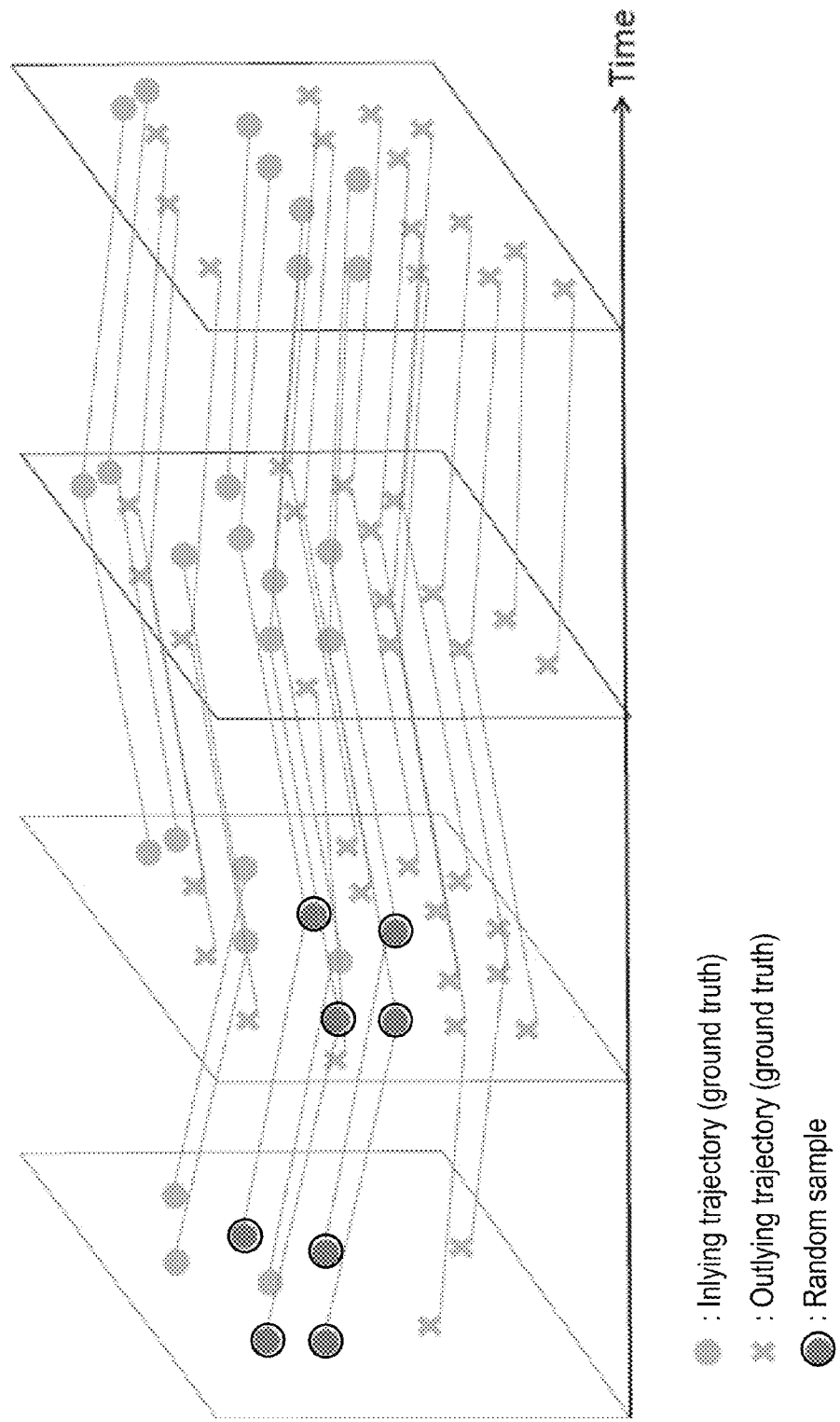
Figure 2C:
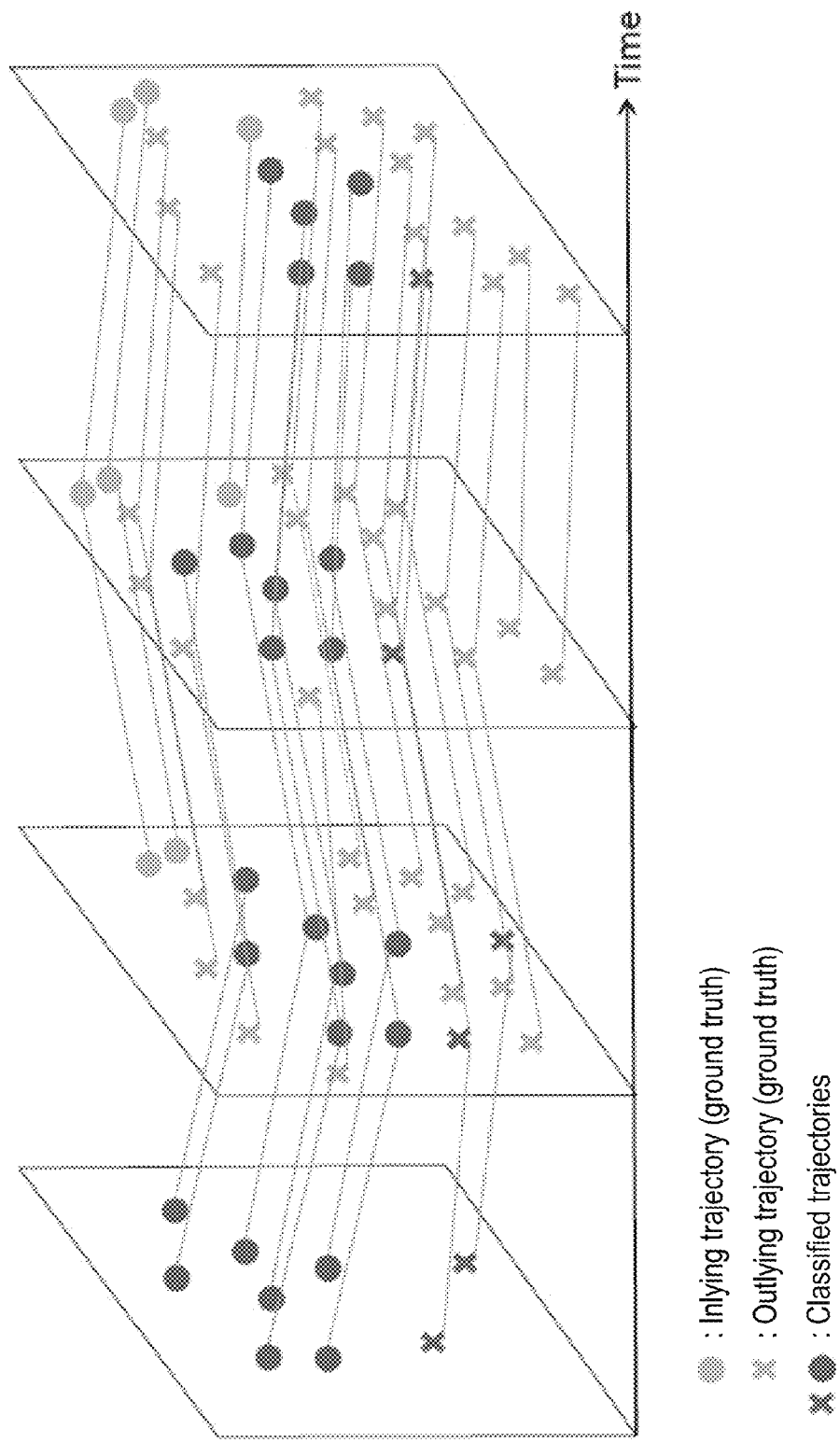
Figure 2D:
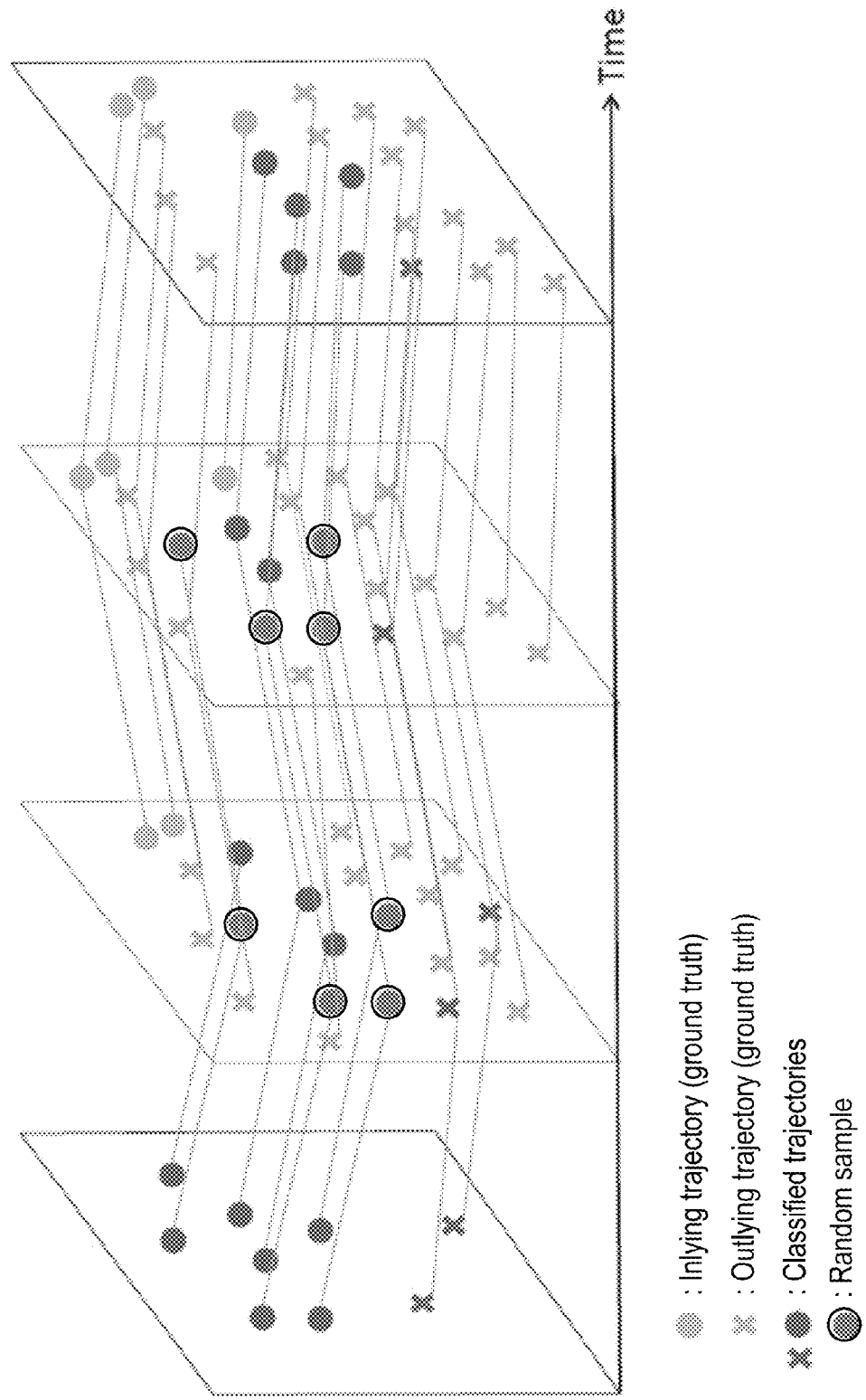
Figure 2E:
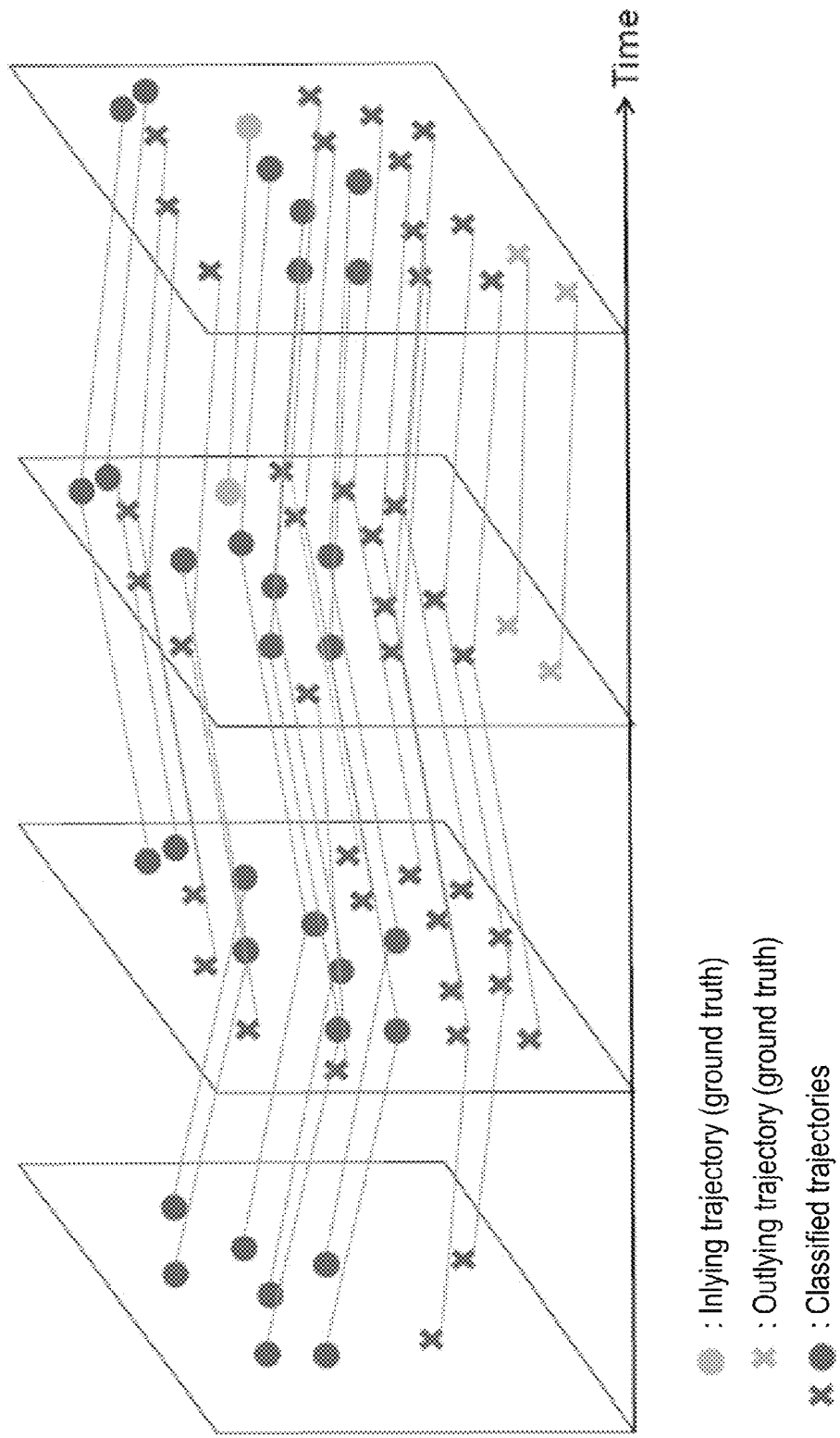
Figure 2F:
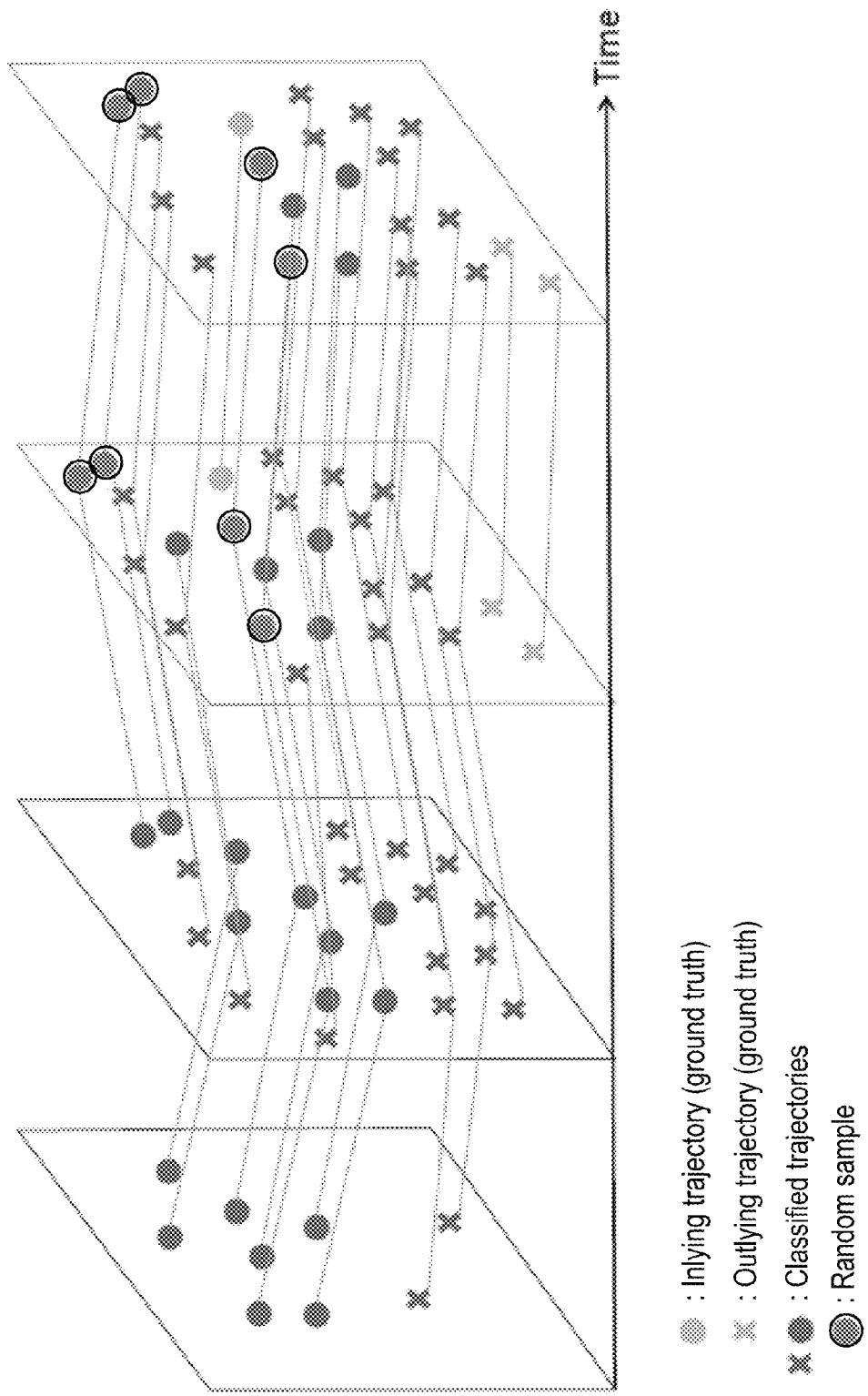
Figure 2G:
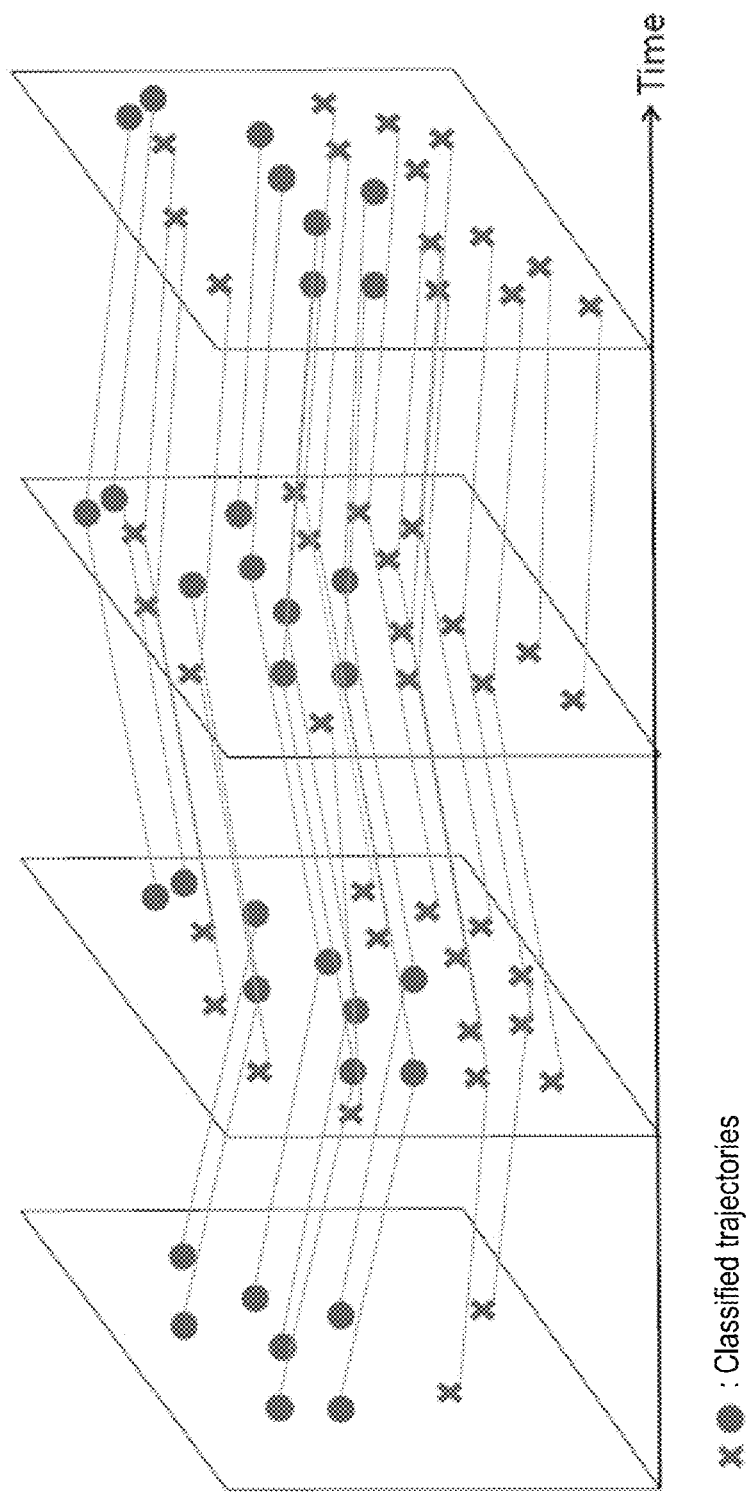

FIGS. 2A through 2G graphically illustrate a plane detection and tracking algorithm being applied to a set of four frames, according to at least some embodiments. In FIG. 2A, the method starts with a set of feature point trajectories over multiple frames. The dots represent inlying trajectories according to ground truth, that is, points tracked on the ground (the dominant plane). The X's represent outliers according to ground truth, e.g. points tracked on trees, moving persons, or other 3D objects. In FIG. 2B, a random sample of four (4) trajectories is selected between the first and second frames and the inter-frame homography is computed, for example using a RANSAC technique. In FIG. 2C, all the trajectories between the first and second frames are partitioned into inliers and outliers by checking whether the trajectories are consistent with the inter-frame homography for the first and second frames. In FIG. 2D, a random sample of four (4) trajectories is selected between the second and third frames from the trajectories previously classified as inliers, and the inter-frame homography is computed. In FIG. 2E, all unclassified trajectories between the second and third frames are partitioned into the sets of inliers and outliers by checking whether the trajectories are consistent with the inter-frame homography for the second and third frames. In FIG. 2F, a random sample of four (4) trajectories is selected between the third and fourth frames from the trajectories previously classified as inliers, and the inter-frame homography is computed. In FIG. 2G, all unclassified trajectories between the third and fourth frames are partitioned into inliers and outliers by checking whether the trajectories are consistent with the inter-frame homography for the third and fourth frames. In this example the total number of trajectories classified as inliers over all the frames is 10. The method may continue to process additional pairs of frames until all pairs have been processed or until the plane disappears (i.e., until the number of inliers falls below a threshold). When no more pairs of frames are to be processed or there are not enough inlier trajectories, the algorithm (algorithm 1) may then be completed to output a set of inter-frame (also referred to as inter-image) homographies for the image sequence.

While both algorithms 1 and 2 include specific examples of values for some parameters (e.g., four random trajectory samples), note that these values may be different in some embodiments. Also note that various embodiments may implement either algorithm 1 or algorithm 2, or both algorithms 1 and 2, or variations thereof.

Handling Plane Transitions

In many real scenarios, the dominant plane may change over time. For example, in urban environments, the dominant plane may change from one building facade to another facade, or to the ground; in indoor scenes, the dominant plane may change from the wall to the ceiling, from one wall to another wall, and so on. Under such circumstances, algorithm 2 may simply stop when the first dominant plane is no longer visible, resulting in an incomplete reconstruction.

A technique to handle plane transitions that may be used in at least some embodiments of the plane detection and tracking method is to re-instantiate the model at the appropriate frame, that is, the frame where the second plane becomes visible. An algorithm that may be used in some embodiments to accomplish this is described below. Note that this algorithm incorporates algorithm 2.

Algorithm for Handling Plane Transitions

1. Set $k_1=1, l=1$.
2. Starting from the $k_1$-th frame, run algorithm 2. Suppose the algorithm stops at the $k_2$-th frame. A set of homographies $H_l = \{H_i^l\}_{i=k_1}^{k_2}$ and a set of inlying trajectories $T_{in}^l$ are obtained.
3. If $k_1 < k_2 < N$, set $T_c^{k_2(k_2+1)} = T^{k_2(k_2+1)} \backslash T_{in}^l$, $k_1 = k_2$, $l = l+1$, and go to step 2. Otherwise, stop.

Note that in step 3 of the algorithm for handling plane transitions, the set of candidate trajectories for the next run are assigned to be the trajectories that are not classified as inliers in the current run. This may help to avoid repeatedly detecting the same plane. The algorithm terminates if no more planes are detected.

An assumption may be made that when transition occurs, both planes are visible in at least two adjacent frames. This may allow the method to obtain a complete reconstruction of the entire sequence by comparing and concatenating the camera motion parameters computed from different planes. More precisely, suppose the method has recovered a set of camera motion parameters $\{R_p^1, \tilde{t}_p^1\}_{p=1}^P$ from $H_1$ associated with the first plane, and another set of camera motion parameters $\{R_q^2, \tilde{t}_q^2\}_{q=1}^Q$ have been recovered from $H_2$ associated with the second plane. Since the two sets of parameters use different world coordinate systems, they need to be aligned to get the complete reconstruction result. In the case where the last two frames of the first plane coincide with the first two frames of the second plane, the relative scale s between the two coordinate systems can be computed as:

$$s = \frac{\|-R_2^2((-R_P^1)^T \tilde{t}_P^1 - (-R_{P-1}^1)^T \tilde{t}_{P-1}^1)\|}{\|\tilde{t}_2^2\|} \quad (A3)$$

In at least some embodiments, the second set of camera motion parameters with respect to the coordinate system associated with the first plane may be computed as:

$$(R_q^2)' = R_q^2 R_{P-1}^1, \ (\tilde{t}_q^2)' = R_q^2 \tilde{t}_{P-1}^1 + s\tilde{t}_q^2, \ q=1, \ldots, Q. \quad \text{(A4)}$$

In addition, at least some embodiments may implement one or more relatively simple heuristics to detect the disappearance of a dominant plane over time and stop the algorithm at the appropriate frame (see step 2 of the algorithm for handling plane transitions). This may be important because in cases where the plane only covers a small part of the images, the homography estimated from it may not be reliable.

A first heuristic that may be used in at least some embodiments is related to the area A of the convex hull of the four points that are chosen to estimate the homography. In at lest some embodiments, the algorithm stops if A is too small, for example if A≤1/16×image width×image height.

A second heuristic that may be used in at least some embodiments is related to the 9×9 covariance matrix C of the estimated homography H. A large entry in C typically indicates some degenerated configuration of the four images points (e.g., three points lie roughly on a line). Therefore, in at least some embodiments, the algorithm may stop if the largest entry in C exceeds a specified threshold.

Figure 6:
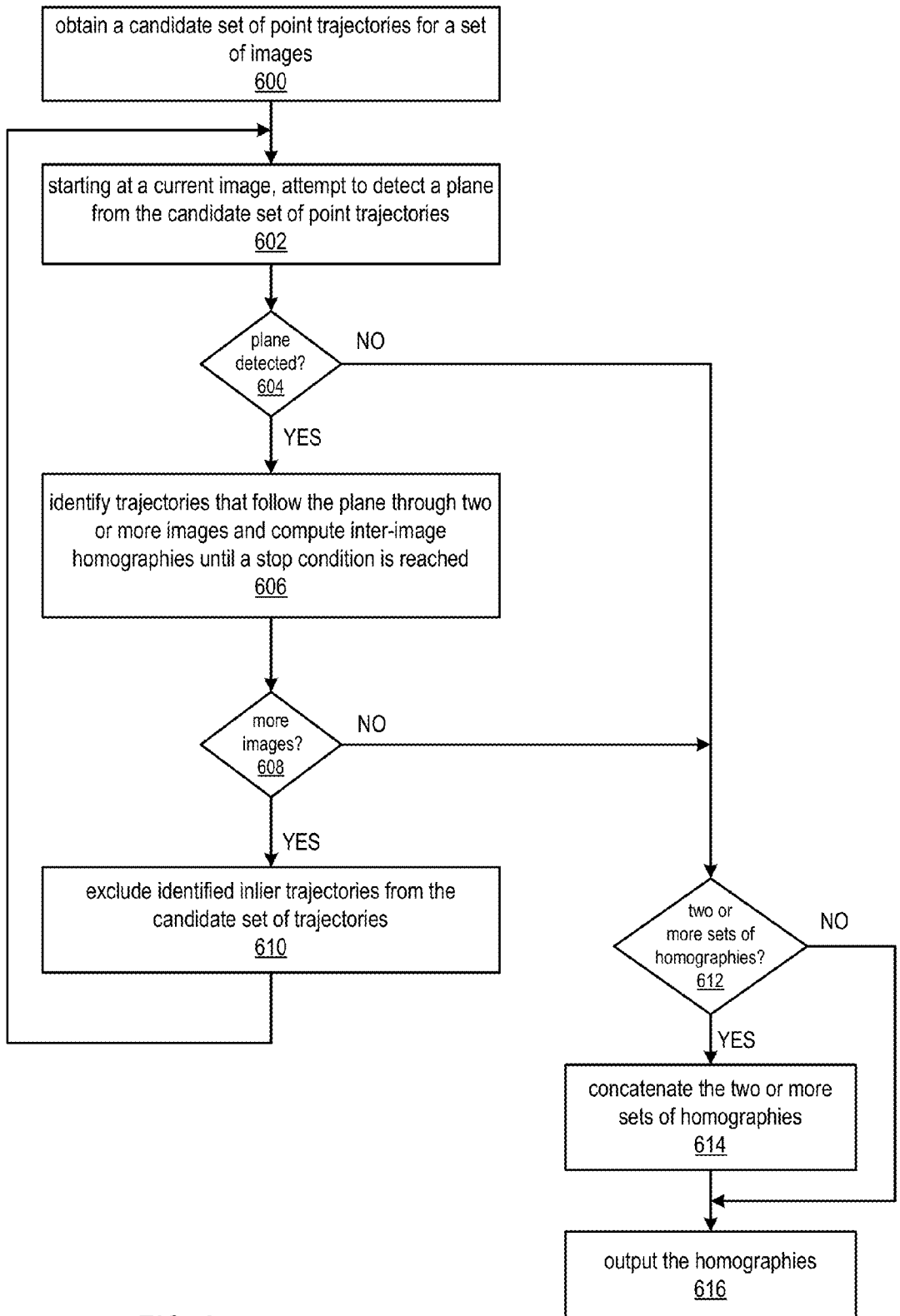
FIG. 6 illustrates a plane detection and tracking method that handles plane transitions, according to at least some embodiments.

FIG. 6 is a flowchart of a plane detection and tracking method that handles plane transitions as described above, according to at least some embodiments. As indicated at 600, a candidate set of point trajectories for a set of images (e.g., a video sequence, or a set of still photographs) may be obtained. Starting at a current image, the method attempts to detect a plane (e.g., a dominant plane) from the candidate set of point trajectories, as indicated at 602. At 604, if a plane is detected, then at 606 the method may identify trajectories that follow the plane through two or more of the images and compute inter-image homographies until a stop condition (e.g., disappearance of the plane and/or the appearance of a new dominant plane) is reached. At 608, if there are more images, then the method returns to 602 to attempt to identify a new (dominant) plane. In at least some embodiments, as indicated at 610, identified inlier trajectories may be excluded from the candidate set of trajectories when attempting to identify a new plane at 602 so that the method can avoid repeatedly detecting the same plane.

If a plane is not detected at 604 or if there are no more images to process at 610, then at 612, if two or more sets of inter-image homographies have been generated by repeating elements 602 and 606 for different planes in different segments of the image sequence, then the two or more sets of inter-image homographies may be concatenated into a single continuous set, as indicated at 614. The homographies are output at 616. Note that the output homographies may, but do not necessarily, cover the entire set of images.

The Plane Detection and Tracking Algorithm and Plane-based Self-calibration

Given the set of homographies $H = \{H_i\}_{i=1}^N$, it is possible to self-calibrate cameras using a method as described in the section titled Robust plane-based self-calibration techniques, and to obtain an initial solution to all the camera and structure parameters. For the sequences with plane transition, each set of homographies $H_l$ may be decomposed into camera and structure parameters as described in the section titled Robust plane-based self-calibration techniques, and then each set of homographies $H_l$ may be concatenated by transferring all the parameters to the same world coordinate system.

Optimal Camera Motion and Scene Structure Recovery

In at least some embodiments, with an initial solution to all the parameters and the set of inlying trajectories $T_{in}$, the estimates may be refined using a non-linear program. For the single dominant plane case, to find the best camera parameters $K_i, R_i, \tilde{t}_i$ and the unit plane normal n, the following geometric errors may be minimized over all inlying trajectories:

$$\min_{x_j, K_i, R_i, \tilde{t}_i, n} \sum_{j: T_j \in T_{in}} \sum_{i=p_j}^{q_j} dist(x_j^i, K_i(R_i + \tilde{t}_i n^T) K_1^{-1} x_j)^2, \quad \text{(A5)}$$

which can be solved, for example, via the Levenberg-Marquardt (LM) method.

Similarly, for the multiple dominant plane cases, the following cost function may be minimized:

$$\min_{x_j, K_i, R_i, \tilde{t}_i, n_l} \sum_{l=1}^{L} \sum_{j: T_j \in T_{in}^l} \sum_{i=p_j}^{q_j} dist(x_j^i, K_i(R_i + \tilde{t}_i n_l^T) K_1^{-1} x_j)^2. \quad \text{(A6)}$$

Reconstruction of 3D Structures

With the known camera parameters and the plane normal, all the points on the plane may be back-projected to their 3D positions. The positions of the off-the-plane points in the 3D space can also be triangulated. In at least some embodiments, to get the optimal estimates, a non-linear program technique may be used to minimize the geometric errors but no longer enforce the planar surface constraint. For example, the following may be used in at least some embodiments:

$$\min_{X_j, K_i, R_i, \tilde{t}_i} \sum_{j} \sum_{i=p_j}^{q_j} dist(x_j^i, K_i(R_i X_j + t_i))^2, \quad \text{(A7)}$$

where $X_j$ is the 3D position of the j-th feature point.

Robust Plane-based Self-calibration Techniques

Embodiments of a method for self-calibrating a projective camera with general, unknown motion from multiple views of a scene where a dominant plane is present are described. This method may be referred to as a plane-based self-calibration technique or algorithm. While conventional methods have provided the ability to solve the self-calibration problem in different settings, these conventional methods often assume the unknown scene structures are general in 3D, and hence break down in the degenerative cases of planar or near-planar scenes. Embodiments of a method for self-calibration are described that, in contrast to conventional methods, can handle such cases by directly using the inter-frame homographies induced by the plane.

Self-calibration is an important component in any Structure from Motion system of cameras with unknown intrinsic parameters. Without self-calibration, only a projective reconstruction can be obtained. Embodiments of the plane-based self-calibration technique may generate a Euclidean reconstruction by estimating camera intrinsic parameters (e.g., focal length), and in addition may solve the entire Euclidean motion estimation problem by providing estimates for camera rotations and translations and the plane normal based on an input set of inter-frame homographies.

Problem Formulation

For the projective camera, a pinhole model, parameterized by a camera intrinsic matrix $K \in \square^{3 \times 3}$ with five unknowns, may be used. The five unknowns are: the focal length along the x and y axes ($f_x$ and $f_y$), a skew parameter θ, and coordinates of the principle point ($o_x$, $o_p$). The model may be described in matrix form as:

$$K \square \begin{bmatrix} f_x & \theta & o_x \\ 0 & f_y & o_y \\ 0 & 0 & 1 \end{bmatrix} \in \square^{3 \times 3}. \tag{B1}$$

Without loss of generality, the world coordinate frame may be chosen to be the camera frame of the first camera, and $R_i \in SO(3)$ and $t_i \in \square^3$ may be used to denote the Euclidean transformation from the world coordinate frame to the i-th camera frame. Note that, by definition, $[R_1, t_1] = [I, 0]$.

It may also be assumed that the world plane π has coordinates $\pi = (n, d)^T$ with respect to the world coordinate frame, where $n^T$ is the unit normal vector and d>0 denotes the distance from the plane to the world origin. Therefore, $n^T X = d$ for any point X on the plane.

Given N views of a planar scene $\{F_i\}_{i=1}^N$, suppose the plane homography between the first frame $F_1$ and a frame $F_i$ has been recovered. The plane homography may be denoted as $H_i$, for $1 \leq i \leq N$. $H_i$ can be expressed in terms of the camera parameters:

$$H_i \square K_i(R_i + t_i n^T / d) K_1^{-1}, \tag{B2}$$

with the symbol $\square$ meaning "equality up to a scale."

Since the translation parameters can only be recovered up to some unknown scale factor $\tilde{t}_i = t_i / d$, a goal of the plane-based self-calibration method can be stated as finding all the unknown camera parameters $K_i, R_i, \tilde{t}$ (the camera intrinsic parameters, rotation, and translation for each frame) and the plane normal n from the given inter-frame homographies $\{H_i\}_{i=1}^N$. The plane-based self-calibration methods described below may recover the camera motion and structure parameters from inter-frame homographies generated for planar or near-planar scenes, for example a set of inter-frame homographies generated according to an embodiment of one of the techniques described in the above section titled Robust plane detection and tracking techniques.

The Plane-based Self-calibration Methods

Although an explicit 3D reconstruction cannot be calculated from a single scene plane, self-calibration is possible. More precisely, if there are a total number of m unknowns in the camera intrinsic parameters of all N views, then a solution is possible provided 2N≥m+4.

Figure 7:
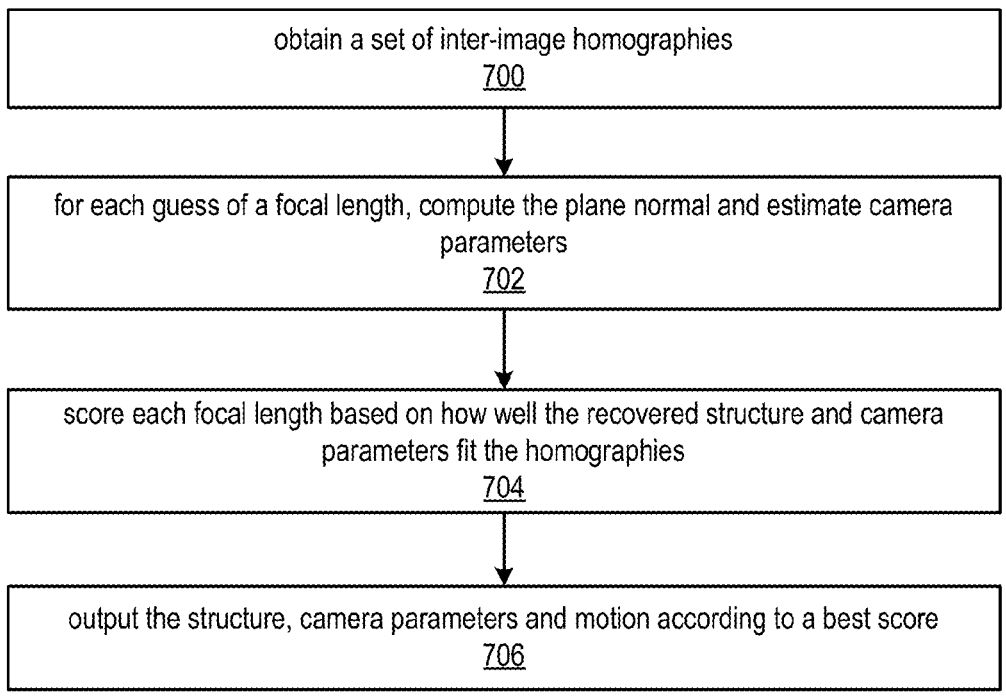
FIG. 7 broadly illustrates a plane-based self-calibration method with constant focal length that takes as input a set of homographies and outputs structure and camera parameters, according to at least some embodiments.
Figure 8:
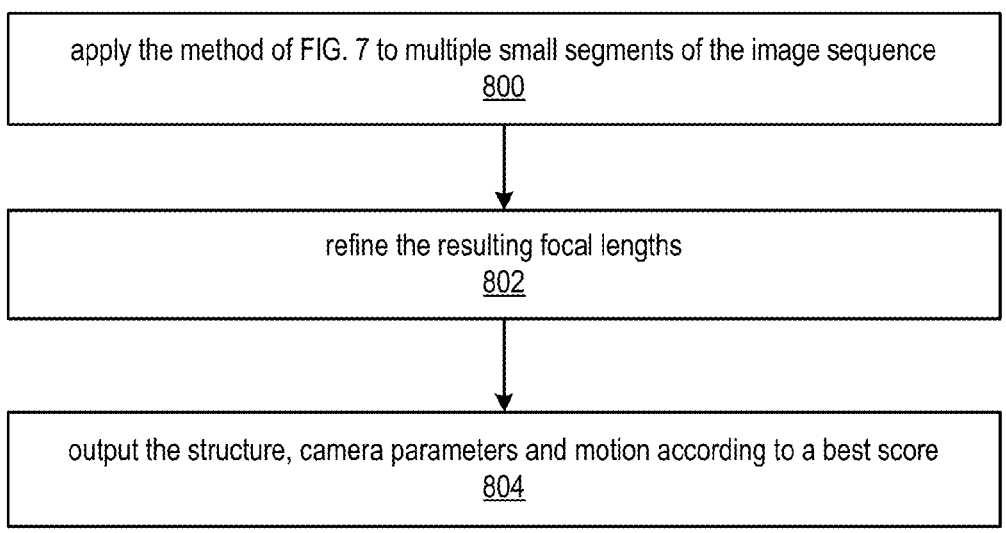
FIG. 8 broadly illustrates a plane-based self-calibration method with varying focal length that takes as input a set of homographies and outputs structure and camera parameters, according to at least some embodiments.

In practice, additional restrictions on the camera intrinsics may be available, which may provide additional algebraic constraints. For example, for most modern digital cameras, zero skew (θ=0) and unit aspect ratio ($f_x = f_y$) may be assumed. It may also be assumed that the principal point coincides with the image center, as the error introduced with this approximation is normally well within the region of convergence of the subsequent nonlinear optimization. As a result, the self-calibration problem may be reduced to simply searching for the focal lengths $\{f_i\}_{i=1}^N$ for all the frames. Two cases are discussed: self-calibration with constant focal length, and self-calibration with varying focal lengths. FIGS. 7 and 8 broadly illustrate these two methods.

FIG. 7 broadly illustrates a plane-based self-calibration method with constant focal length that takes as input a set of homographies and outputs structure and camera parameters, according to at least some embodiments. As indicated at 700, a set of inter-image homographies may be obtained, for example as output by one of the plane detection and tracking algorithms (algorithms 1 and 2) as described above. As indicated at 702, for each guess of a focal length, the plane normal may be computed, and camera parameters may be estimated. As indicated at 704, each focal length may then be scored based on how well the recovered structure and camera parameters fit the homographies. As indicated at 706, the structure, camera parameters, and motion corresponding to a best score may be output.

FIG. 8 broadly illustrates a plane-based self-calibration method with varying focal length that takes as input a set of homographies and outputs structure and camera parameters, according to at least some embodiments. A set of inter-image homographies may be obtained for an image sequence. As indicated at 800, the method of FIG. 7 may be applied to multiple small segments of the image sequence. As indicated at 802, the resulting focal lengths may then be refined. As indicated at 804, the structure, camera parameters, and motion corresponding to a best score may be output.

The methods of FIGS. 7 and 8 and variations thereof are described in more detail below.

Self-Calibration with Constant Focal Length

In many real scenarios, the focal length of the camera remains constant over the entire sequence. When this is the case, $K_1 = K_2 = \ldots = K_N \square K$ and equation (B2) becomes:

$$H_i \square K(R_i + \tilde{t}_i n^T) K^{-1} \tag{B3}$$

The plane-based self-calibration method may be based on two observations. First, if the focal length f (or equivalently the matrix K) is given, then there are at most two physically possible solutions for a decomposition of any H into parameters $\{R, \tilde{t}, n\}$. Furthermore, the space of possible values of f is inherently bounded by the finiteness of the acquisition devices. In this discussion, the following is assumed: $f \in [0.3 f_0, 3 f_0]$ where $f_0$ is some nominal value defined as the sum of half width and half height of the image.

In at least some embodiments, the following general method may be implemented:

1. Given each guess on f, compute the plane normal n from the homography induced by any two images. This yields at most two physically possible n's. For each n, estimate all the camera parameters $\{R_i, \tilde{t}_i\}_{i=2}^N$ and refine the estimates via a non-linear least squares technique.
2. Enumerate the space of focal lengths (a subset of $\square$) and score each focal length f based on how well the recovered structure and camera parameters fit the homographies.
3. Select a best solution according to the scores.

Each of the steps in the above method is discussed in more detail below.

Planar Homography Decomposition

Embodiments may employ a technique for decomposing a homography matrix into structure and camera parameters, which may be referred to as a planar homography decomposition method. Note that in the Euclidean frame, a homography matrix H may be written in the form:

$$H = \lambda (R + \tilde{t} n^T) \tag{B4}$$

for some scale factor λ. The plane homography decomposition method may compute λ using the fact that |λ| is equal to the second largest singular value of H:

$$|\lambda| = \sigma_2(H). \tag{B5}$$

The sign of λ may be determined by imposing the positive depth constraint $x_2^T H x_1 > 0$ for any point correspondence ($x_1$, $x_2$) between the two images.

Now let $\tilde{H} = H / \lambda = R + \tilde{t} n^T$. $\tilde{H}^T \tilde{H}$ may be diagonalized into the form:

$$\tilde{H}^T \tilde{H} = V \Sigma V^T, \tag{B6}$$

where $\Sigma=\text{diag}\{\sigma_1^2,\sigma_2^2,\sigma_3^2\}$ and $V=[v_1,v_2,v_3]\in SO(3)$. By defining vectors:

$$u_1 \triangleq \frac{\sqrt{1-\sigma_3^2}\,v_1 + \sqrt{\sigma_1^2-1}\,v_3}{\sqrt{\sigma_1^2-\sigma_3^2}}, \quad \text{(B7)}$$

$$u_2 \triangleq \frac{\sqrt{1-\sigma_3^2}\,v_1 + \sqrt{\sigma_1^2-1}\,v_3}{\sqrt{\sigma_1^2-\sigma_3^2}},$$

it is possible to verify that H preserves the length of any vectors inside each of the two subspaces:

$$S_1=\text{span}\{v_2,u_1\},\ S_2=\text{span}\{v_2,u_2\}. \quad \text{(B8)}$$

Let matrices:

$$U_1=[v_2,u_1,\bar{v}\,u_1],\ W_1=[Hv_2,Hu_1,\bar{H}v_2Hu_1],$$

$$U_2=[v_2,u_1,\bar{v}\,u_2],\ W_2=[Hv_2,Hu_1,\bar{H}v_2Hu_2],$$

then there are:

$$RU_1=W_1,\ RU_2=W_2, \quad \text{(B9)}$$

from which R can be determined. The four solutions for decomposing $\tilde{H}$ to $\{R,\tilde{t},n\}$ (i.e., the four solutions to the planar homography decomposition) are given in Table 1, shown in FIG. 9. The positive depth constraint can be imposed to reduce the number of physically possible solutions to at most two: $n^T e_3 = n_3 > 0$.

Also of interest is the related problem of decomposing another homography H' into $\{R',\tilde{t}'\}$ using the plane normal n computed from H. Here $U_1, U_2$ remain unchanged and $W_1'$, $W_2'$ may be defined as $$W_1'=[H'v_2,H'u_1,\bar{H}'v_2H'u_1],\ W_2'=[H'v_2,H'u_2,\bar{H}'v_2H'u_2] \quad \text{(B10)}$$

Note that if the two planes inducing H and H' have the same normal vector, there must exist some $R'\in SO(3)$ such that:

$$R'U_1=W_1',\ R'U_2=W_2' \quad \text{(B11)}$$

However, when the above assumption does not hold, the best R' in the least squares sense may still be found. Taking the equation $R'U_1=W_1'$ as an example, the following may be solved:

$$\min_{R'\in SO(3)} \|W_1' - R'U_1\|_F, \quad \text{(B12)}$$

which has a closed-form solution:

$$R'=U'V'^T \quad \text{(B13)}$$

where $W_1'U_1^T=U'\Sigma'V'^T$ is the singular value decomposition of $W_1'U_1^T$. Finally, $\tilde{t}'$ is given by $$\tilde{t}'=(H'-R')n. \quad \text{(B14)}$$

Estimation of the Focal Length

As previously mentioned, embodiments of the plane-based self-calibration algorithm may determine the focal length f by enumerating all of its possible values and checking how well the resulting camera parameters $\{R_i,\tilde{t}_i\}_{i=2}^{N}$ and plane normal n fit the homography matrices $\{\bar{H}_i\}_{i=2}^{N}$ where $\bar{H}_i=K^{-1}H_iK$. Mathematically, a task is to minimize the following objective function:

$$\min_{\lambda_i,R_i,\tilde{t}_i,n} C_1 = \sum_{i=2}^{N} w_i\|\bar{H}_i/\lambda_i - (R_i + \tilde{t}_i n^T)\|_F^2 \quad \text{(B15)}$$

where $w_i$ is a weight which is set to be the number of inlying trajectories used to estimate $H_i$. This non-linear optimization problem can be solved, for example, via the Levenberg-Marquardt (LM) method. To obtain an initial estimate of all parameters, at least some embodiments may use a three-stage scheme. First, all the $\lambda_i$'s may be estimated using equation (B5). Then, one homography may be picked, and n may be computed according to Table 1. Finally, for each of the two physically possible n's, $[R_i,\tilde{t}_i]_{i=2}^{N}$ may be computed using equations (B13) and (B14).

The computational complexity of this method is linear in the number of samples of f. More importantly, note that in equation (B15) only the plane normal n is shared by all the homographies. Therefore, in at least some embodiments, a sparse LM algorithm may be implemented to solve equation (B15) efficiently.

Choosing the Homography Used for Computing n

Note that in the extreme case when the translation component $t_i$ is zero, it may be impossible to recover n from $H_i$ according to equation (B2). Moreover, in practice the recovered homographies may be subject to some small errors. Therefore, a large $t_i$ may be used in at least some embodiments, as a large $t_i$ may yield a more stable estimate of n if all the $H_i$'s are of roughly the same noise level. Consequently, at least some embodiments may always choose a homography $H_N$ between the first and last frames for estimating n.

Scoring the Reconstructions

There are several ways to score the Euclidian reconstructions estimated at each sampled focal length f. For example, a fitting error $C_1$ may be compared to several other cost functions. One example cost function compares the normalized difference of the two non-zero singular values $\sigma_i^1$ and $\sigma_i^2$ ($\sigma_i^1 \geq \sigma_i^2$) of the matrix $\bar{H}_i\hat{n}$:

$$C_2 = \sum_{i=2}^{N} \frac{\sigma_i^1 - \sigma_i^2}{\sigma_i^1}. \quad \text{(B16)}$$

Instead or in addition, the closeness of the two singular values may be measured, for example using log-anisotropy:

$$C_2' = \sum_{i=2}^{N} \log\frac{\sigma_i^1}{\sigma_i^2}. \quad \text{(B17)}$$

Another cost function that may be used instead of or in addition to the above may be derived based on a statistical error measurement:

$$C_3 = \sum_{i=2}^{N} \left\{ \frac{(\|a_i\|^2 - \|b_i\|^2)/4}{\|x\|^2\|K^{-T}a_i\|^2 + \|y\|^2\|K^{-T}b_i\|^2 + 2(a_i^T K^{-1}K^{-T}b_i)(x^T y)} + \frac{(a_i^T b_i)^2}{\|x\|^2\|K^{-T}b_i\|^2 + \|y\|^2\|K^{-T}b_i\|^2 + 2(a_i^T K^{-1}K^{-T}b_i)(x^T y)} \right\}$$

where $(x, y) = K(v_2, u_1)$ for S1 or $(x, y) = K(v_2, u_2)$ for $S_2$ as defined in equation (B8), and $(a_i, b_i) = K^{-1} H_i K(x, y)$.

Constant Focal Length Self-calibration Algorithm

An example of the self-calibration algorithm according to at least some embodiments is given below as algorithm 3. Note that this example algorithm is not intended to be limiting.

Algorithm 3 (Self-calibration with Constant Focal Length)

01: Input: A set of N homographies $\{H_i\}_{i=1}^N$.
02: for each guess on f:
03: Compute the plane normal n from $H_N$. This yields at most two physically possible n's.
04: for each n:
05: Estimate $\{R_i, \tilde{t}_i\}_{i=1}^N$ using equations (B13), (B14).
06: Refine $\{K_i, R_i, \tilde{t}_i\}_{i=1}^N$ and n via a non-linear least squares technique.
07: end for
08: end for
09: Select the best f according to the geometric scores.
10: Output: Plane unit normal n, camera intrinsic matrices $\{K_i\}_{i=1}^N$ and motion $\{R_i, \tilde{t}_i\}_{i=1}^N$.

Figure 10:
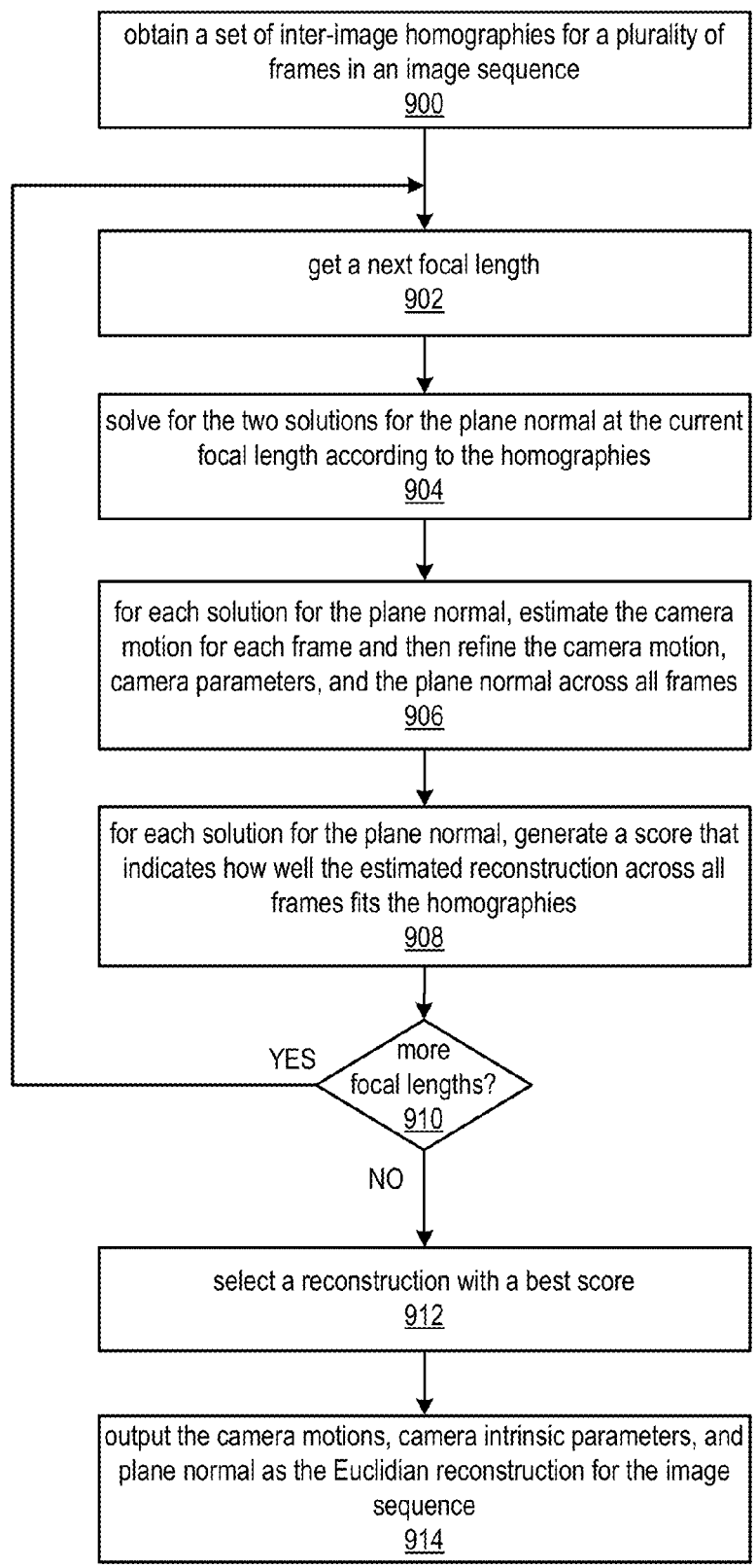
FIG. 10 is a more detailed flowchart of the self-calibration method with constant focal length, according to at least some embodiments.

FIG. 10 is a more detailed flowchart of the self-calibration method with constant focal length, according to at least some embodiments. As indicated at 900, a set of inter-image homographies for a plurality of frames in an image sequence may be obtained. For example, the set of inter-image homographies may be generated according to an embodiment of one of the techniques described in the above section titled Robust plane detection and tracking techniques.

To perform self-calibration, the method may solve for a reconstruction at each of a plurality of focal lengths. At each focal length, two solutions for the plane normal may be found according to two of the homographies (for example a first and last homography), and used to estimate the reconstruction across all the frames. Thus, there are two reconstructions estimated at each of the focal lengths. Each reconstruction is scored, and a reconstruction for the sequence with a best score is selected.

As indicated at 902, a next focal length is selected. As indicated at 904, the two solutions for the plane normal at the current focal length are found according to the homographies. As indicated at 906, for each solution for the plane normal, the camera motion is estimated for each frame. The camera motion, camera parameters, and the plane normal may then be refined across all frames, for example according to a non-linear least squares technique. As indicated at 908, for each solution for the plane normal, a score may be generated that indicates how closely the estimated reconstruction fits the inter-image homographies.

At 910, if there are more focal lengths at which reconstructions are to be estimated, then the method returns to 902. Otherwise, as indicated at 912, a reconstruction with a best score is selected for the image sequence. The camera motions for each frame, camera intrinsic parameters for each frame, and plane normal for the sequence are output as the Euclidian reconstruction for the image sequence, as indicated at 914.

Self-calibration with Varying Focal Length

The self-calibration method described above may be extended to the case of varying focal length. An observation is that for real world sequences, focal length tends to not change much over any short period of time. Therefore, the entire sequence may be divided into many small segments of k frames, and the method for constant focal length may be applied within each segment. Once an initial solution to the homography decomposition problem has been obtained, the constant-focal-length constraint is dropped, and all the focal lengths may be refined, for example via nonlinear optimization. In this case, the following problem is of interest:

$$\min_{K_i, \lambda_i, R_i, \tilde{t}_i, n} C_v = \sum_{i=2}^N \|K_i^{-1} H_i K_1 / \lambda_i - (R_i + \tilde{t}_i n^T)\|_F^2. \quad (B18)$$

An example algorithm to implement this procedure that may be used in some embodiments is given below as algorithm 4. Note that this example algorithm is not intended to be limiting.

Algorithm 4 (Self-calibration with Varying Focal Length, Version 1)

01: Input: A set of N homographies $\{H_i\}_{i=1}^N$. A partition of the frames into m segments of size k.
02: for each guess on f
03: Set $\{f_1, \ldots, f_k\}$ of the first segment to f and compute the plane normal n from $H_k$. This yields at most two physically possible n's.
04: for each n
05: Estimate $\{R_i, \tilde{t}_i\}_{i=1}^k$ within the first segment.
06: Refine $\{K_i, R_i, \tilde{t}_i\}_{i=1}^k$ and n via a non-linear least squares technique.
07: for $2 \leq j \leq m$ (for each segment)
08: Set $\{f_{k \times (j-1)+1}, \ldots, f_{k \times j}\}$ to $f_{k \times (j-1)}$ and compute
$\{R_i, \tilde{t}_i\}_{i=k \times (j-1)+1}^{k \times j}$.
09: Refine $\{K_i, R_i, \tilde{t}_i\}_{i=1}^{k \times j}$ and n via a non-linear least squares technique.
10: end for
11: end for
12: end for
13: Keep the best f according to the geometric scores.
14: Output: Plane unit normal n, camera intrinsic matrices $\{K_i\}_{i=1}^N$ and motion $\{R_i, \tilde{t}_i\}_{i=1}^N$.

Figure 11:
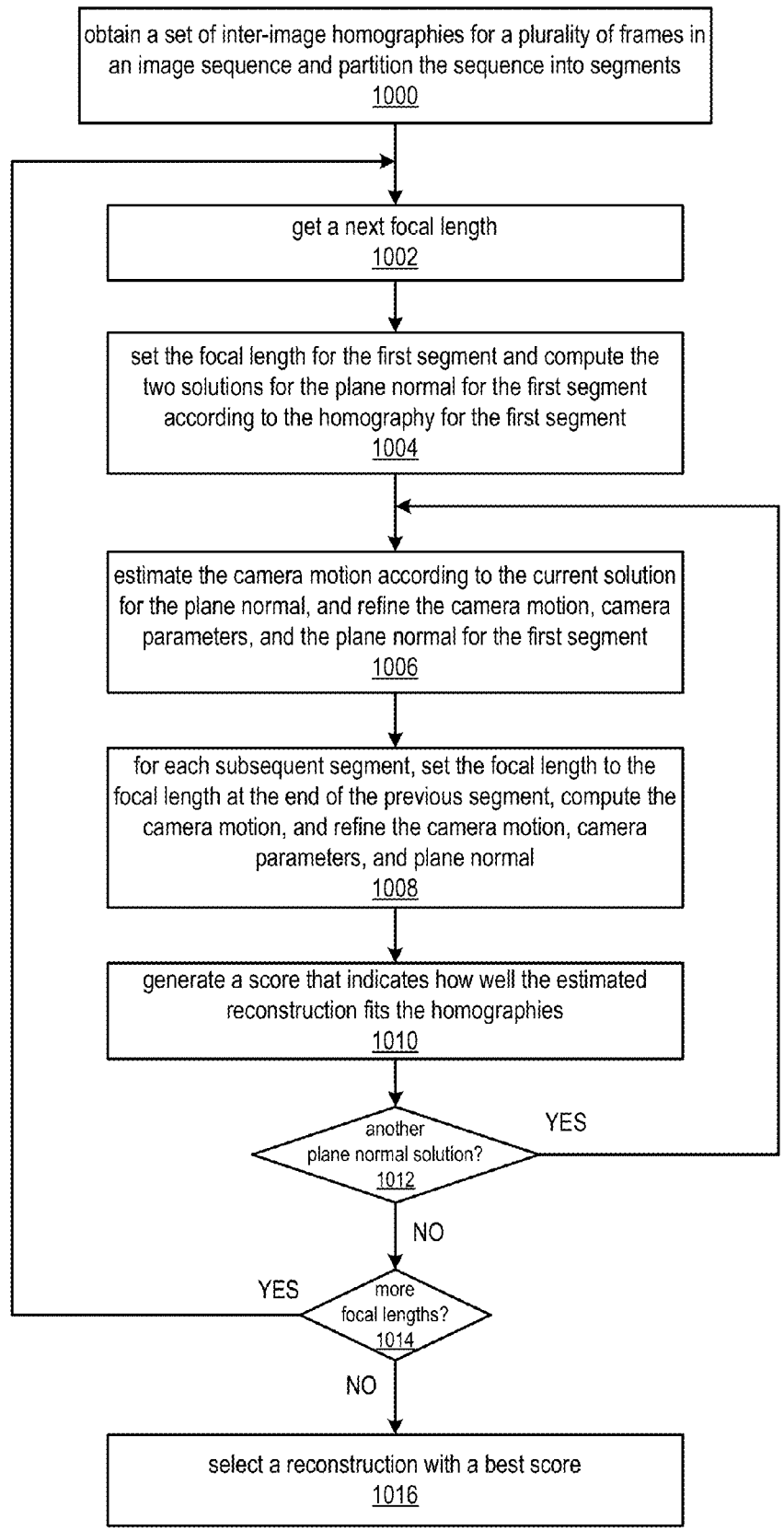
FIG. 11 is a more detailed flowchart of the self-calibration method with varying focal length, according to at least some embodiments.

FIG. 11 is a flowchart of an embodiment of the self-calibration method for varying focal lengths according to algorithm 4. As indicated at 1000, a set of inter-image homographies for a plurality of frames in an image sequence may be obtained. For example, the set of inter-image homographies may be generated according to an embodiment of one of the techniques described in the above section titled Robust plane detection and tracking techniques. The image sequence is partitioned into a plurality of segments.

To perform self-calibration, the method may solve for a reconstruction at each of a plurality of focal lengths. At each focal length, two solutions for the plane normal may be found for a first segment. For each solution to the plane normal, a reconstruction is estimated for the first segment and extrapolated across all the segments. Thus, there are two reconstructions for the sequence estimated at each of the focal lengths. Each reconstruction is scored, and a reconstruction for the sequence with a best score is selected.

As indicated at 1002, a next focal length is obtained. As indicated at 1004, the focal length for the first segment is set to the focal length and the two solutions for the plane normal for the first segment are computed according to a homography for the first segment. As indicated at 1006, the camera motion is estimated for the first segment according to the current solution for the plane normal, and the camera motion, camera parameters, and the plane normal for the first segment are then refined, for example according to a non-linear least squares technique. As indicated at 1008, for each subsequent segment, the focal length is to the focal length at the end of the previous segment, the camera motion is computed, and the camera motion, camera parameters, and plane normal are refined. As indicated at 1010, a score is generated that indicates how well the estimated reconstruction fits the set of homographies for the image sequence.

At 1012, if there is another plane normal solution, then the method returns to element 1006. Otherwise, at 1014, if there are more focal lengths, then the method returns to element 1002. At 1014, once all focal lengths to be tested have been processed, then a reconstruction with a best score may be selected for the image sequence, as indicated at 1016. The camera motions for each frame, camera intrinsic parameters for each frame, and plane normal for the sequence are output as the Euclidian reconstruction for the image sequence.

The above self-calibration method (algorithm 4) has the same search complexity as the constant focal length case, but requires solving a non-linear optimization problem multiple times. A potential drawback of this approach is that the initial estimate of n in step 1 may not be very accurate as only the first k frames are used (small translation component) and the focal length is only approximately constant. As an alternative, in some embodiments, all possible values of $(f_1, f_n) \in \Box^2$ may be sampled, and for each sample point n may be computed using $H_N$ between the first and last frames. Then, $f_i$, $i=2, \ldots N-1$ may be estimated using the following equation:

$$\|K_i^{-1}H_iK_1v_2\|^2 = \|K_i^{-1}H_iK_1u_1\|^2 \text{ or } \|K_i^{-1}H_iK_1v_2\|^2 = \|K_i^{-1}H_iK_1u_2\|^2, \quad (B19)$$

depending on the choice of n from the two physically possible solutions.

This procedure may yield a better initial estimation of n at the cost of a larger search space. An example algorithm to implement this procedure that may be used in some embodiments is given below as algorithm 5. Note that this example algorithm is not intended to be limiting.

Algorithm 5 (Self-calibration with Varying Focal Length, Version 2)

01: Input: A set of N $\{H_i\}_{i=1}^N$.
02: for each guess on $f_1$ and $f_N$:
03: Compute the plane normal n from $H_N$. This yields at most two physically possible n's.
04: for each n
05: Estimate $\{K_i\}_{i=2}^{N-1}$ using equation (B19).
06: Estimate $\{R_i, t_i\}_{i=1}^N$ using equations (B13), (B14).
07: Refine $\{K_i, R_i, t_i\}_{i=1}^N$ and n via a non-linear least squares technique.
08: end for
09: end for
10: Keep the best $(f_1, f_N)$ according to the geometric scores.
11: Output: Plane unit normal n, camera intrinsic matrices $\{K_i\}_{i=1}^N$ and motion $\{R_i, \tilde{t}_i\}_{i=1}^N$.

Figure 12:
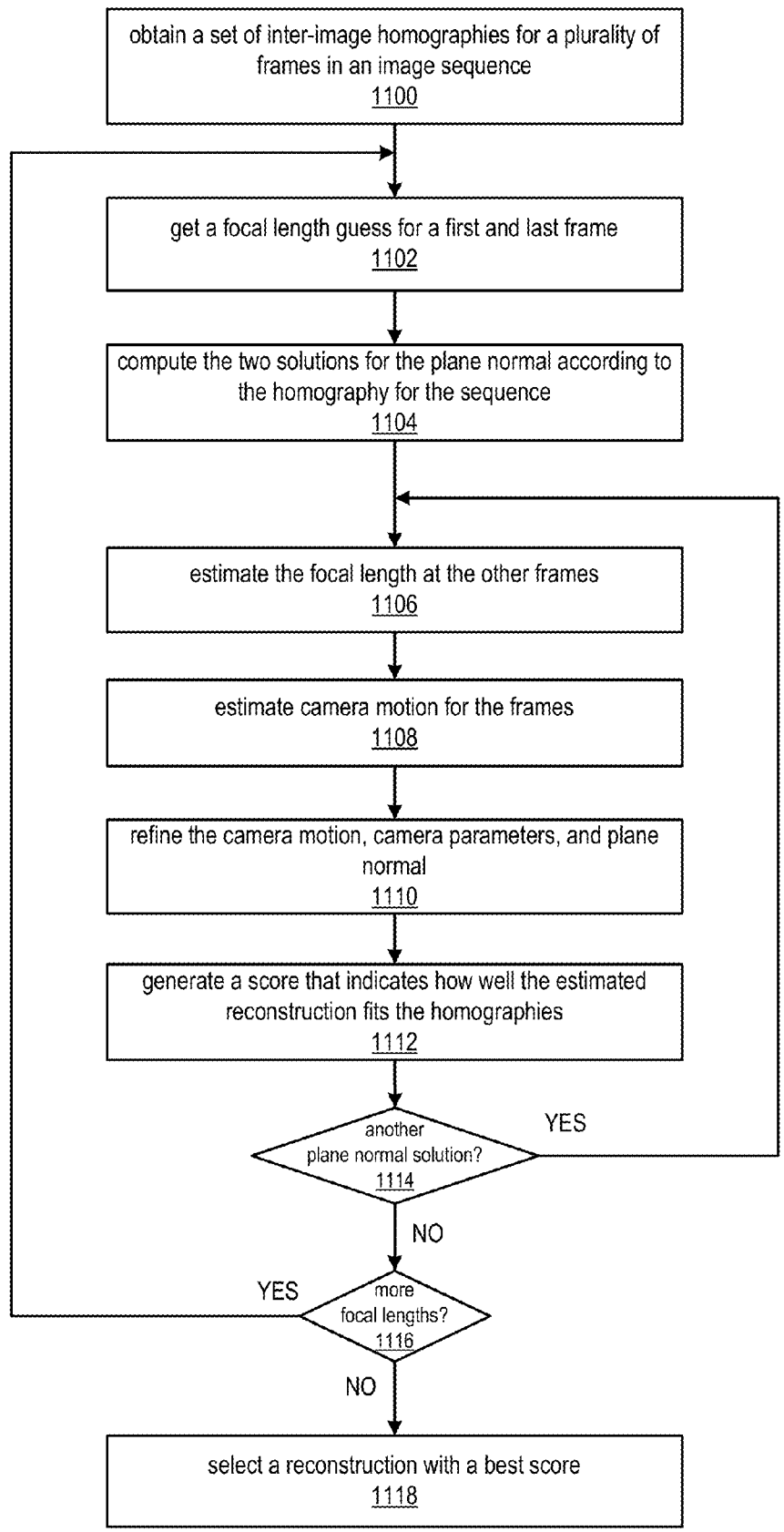
FIG. 12 is flowchart of an alternative self-calibration method with varying focal length, according to at least some embodiments.

FIG. 12 is a flowchart of an embodiment of the self-calibration method for varying focal lengths according to algorithm 5. As indicated at 1100, a set of inter-image homographies for a plurality of frames in an image sequence may be obtained. For example, the set of inter-image homographies may be generated according to an embodiment of one of the techniques described in the above section titled Robust plane detection and tracking techniques.

To perform self-calibration, the method may solve for a reconstruction at each of a plurality of guesses at focal lengths for two frames (e.g., a first and last frame in the image sequence). At each pair of focal lengths, two solutions for the plane normal may be found for the image sequence. For each solution to the plane normal, the focal length is estimated across the frames. Camera motion (rotation and translation) is estimated across the frames according to the focal lengths. The camera intrinsic parameters (e.g., focal length), camera motion, and plane normal are then refined. Thus, there are two reconstructions for the sequence estimated at each pair of focal lengths. Each reconstruction is scored, and a reconstruction for the sequence with a best score is selected.

As indicated at 1102, a next guess for a focal length at a first and a last frame may be obtained. This gives two focal lengths, one for the first frame and one for the last frame. Note that the guesses may be made at other frames in the image sequence in some embodiments. As indicated at 1104, the two solutions for the plane normal for the image sequence are computed according to a homography for the image sequence. As indicated at 1106, the focal length at the other frames may then be estimated, for example according to equation (B19). As indicated at 1108, the camera motion is estimated for the first segment according to the current solution for the plane normal, for example according to equations (B13) and (B14). As indicated at 1110, the camera motion, camera parameters, and the plane normal are then refined, for example according to a non-linear least squares technique. As indicated at 1112, a score is generated that indicates how well the estimated reconstruction fits the set of homographies for the image sequence.

At 1114, if there is another plane normal solution, then the method returns to element 1106. Otherwise, at 1116, if there are more focal lengths, then the method returns to element 1002. At 1116, once all focal length pairs to be tested have been processed, then a reconstruction with a best score may be selected for the image sequence, as indicated at 1118. The camera motions for each frame, camera intrinsic parameters for each frame, and plane normal for the sequence are output as the Euclidian reconstruction for the image sequence.

Example Implementations

Some embodiments may include a means for generating a set of inter-image homographies from a set of point trajectories according to a plane detection and tracking technique, and/or for generating structure and motion for a set of images or frames based on a set of received homographies according to plane-based self-calibration technique. For example, a plane detection and tracking module may receive input specifying a set of point trajectories and generate as output a set of homographies as described herein, and a plane-based self-calibration module may receive as input a set of homographies and generate as output structure and motion for a set of images or frames as described herein. In some embodiments, a single module may incorporate both the plane detection and tracking technique and the plane-based self-calibration technique as described herein to take as input a set of trajectories and provide as output structure and motion for a set of images or frames. These modules may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module(s) may be at least partially implemented by hardware circuitry and/or firmware stored, for example, in a non-volatile memory.

Figure 16:
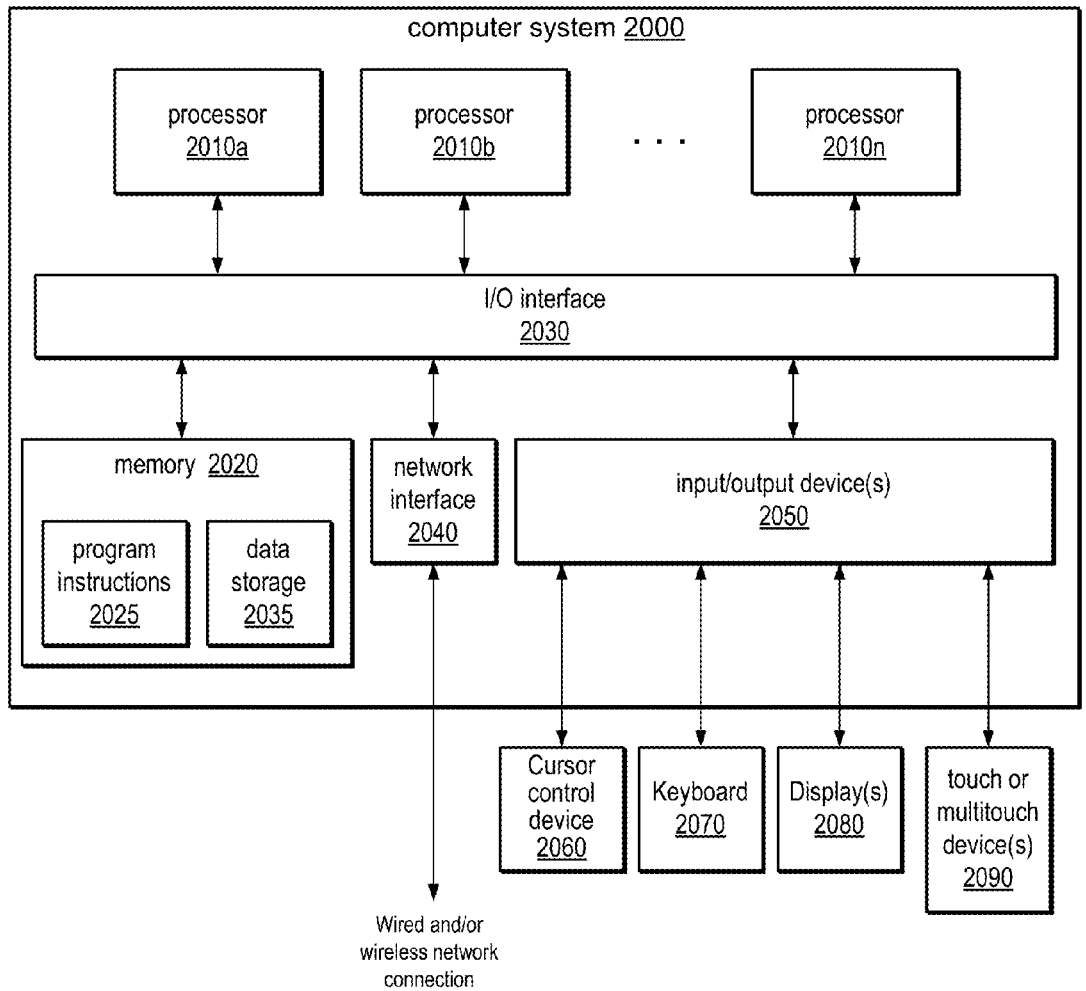
FIG. 16 illustrates an example computer system that may be used in embodiments.

Embodiments of the module(s) may, for example, be implemented as stand-alone applications, as module(s) of an application, as a plug-in or plug-ins for applications including image or video processing applications, and/or as a library function or functions that may be called by other applications such as image processing or video processing applications. Embodiments of the module(s) may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. Example modules that may implement the plane-based SFM techniques as described herein are illustrated in FIGS. 13, 14, and 15. An example computer system on which the module(s) may be implemented is illustrated in FIG. 16. Note that one or more of the modules may, for example, be implemented in still cameras and/or video cameras.

FIG. 13 illustrates an example plane detection and tracking module that may implement one or more of the plane detection and tracking techniques illustrated in the accompanying Figures and described herein, for example as algorithms 1 or 2, or any of FIGS. 3 through 6, according to at least some embodiments. Module 1600 may, for example, receive an input image sequence 1620 and/or a set of point trajectories for the images in a sequence. Module 1600 then applies one or more of the plane detection and tracking techniques as described herein to generate homographies from the trajectories by detecting plane(s) in the images 1620, identifying trajectories that track plane(s) through the images, and using the identified trajectories to generate inter-image homographies. Module 1600 generates as output at least a set of homographies 1630 for the images, as described herein.

FIG. 14 illustrates an example plane-based self-calibration module that may implement one or more of the plane-based self-calibration techniques illustrated in the accompanying Figures and described herein, for example as algorithms 3, 4 and 5 or FIGS. 7, 8, 10, 11, and 12 according to at least some embodiments. Module 1700 may, for example, receive an input a set of homographies 1730 corresponding to a set of images. The set of homographies 1730 may, for example, be the output of module 1600 as illustrated in FIG. 13. Module 1700 then applies one or more of the plane-based self-calibration techniques as described herein to the homographies 1730 to generate structure, camera parameters, and motion according to a best score for focal lengths that were tested. Module 1700 generates as output at least the structure, camera parameters, and motion, as described herein as camera motion and other parameters 1740.

While FIGS. 13 and 14 show the plane detection and tracking method and the plane-based self-calibration method implemented as separate modules, note that embodiments of the plane detection and tracking method and of the plane-based self-calibration method described herein may be implemented in a single module that receives point trajectories for a set of images and outputs the structure, camera parameters, and motion for the set of images, as shown in FIG. 15. FIG. 15 illustrates an example SFM module that implements embodiments of a plane detection and tracking method and of a plane-based self-calibration method as described herein. Module 1900 may, for example, receive an input image sequence 1920 and/or a set of point trajectories for the images in a sequence. Module 1900 then applies a plane detection and tracking 1902 technique as described herein to generate homographies from the trajectories by detecting plane(s) in the images 1920, identifying trajectories that track plane(s) through the images, and using the identified trajectories to generate inter-image homographies. Plane detection and tracking 1902 generates at least a set of homographies 1930 for the images. A plane-based self-calibration 1904 technique is to the homographies 1930 to generate structure, camera parameters, and motion according to a best score for focal lengths that were tested. Output of module 1900 is at least the camera motion and other parameters 1940 as generated by the plane-based self-calibration 1904 technique.

Example Applications

Example applications of the plane-based SFM techniques including the plane detection and tracking techniques and the plane-based self-calibration techniques as described herein may include one or more of, but are not limited to, 3D modeling, video stabilization, video augmentation (augmenting an original video sequence with graphic objects), video classification, and robot navigation. In general, embodiments of one or more of the techniques may be used to provide homographies and/or structure and motion to any application that requires or desires such output to perform some video- or image-processing task.

Example System

Embodiments of the various plane-based SFM techniques as described herein, including the plane detection and tracking method for generating homographies for a set of images and the plane-based self-calibration techniques for generating structure, camera parameters, and motion from sets of homographies, may be executed on one or more computer systems, which may interact with various other devices. One such computer system is illustrated by FIG. 16. In different embodiments, computer system 2000 may be any of various types of devices, including, but not limited to, a personal computer system, desktop computer, laptop, notebook, or netbook computer, mainframe computer system, handheld computer, workstation, network computer, a camera, a video camera, a tablet or pad device, a smart phone, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multitouch-enabled device(s) 2090. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, be implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the plane-based SFM techniques described herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various plane-based SFM techniques are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor(s) 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor(s) 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2025, configured to implement embodiments of the various plane-based SFM techniques as described herein, and data storage 2035, comprising various data accessible by program instructions 2025. In one embodiment, program instructions 2025 may include software elements of embodiments of the various plane-based SFM techniques as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the various plane-based SFM techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   generating, by one or more computing devices, a Euclidean reconstruction for an image sequence comprising a plurality of frames according to a set of inter-image homographies estimated from point correspondences of structures in an entire scene for the image sequence, wherein each inter-image homography represents a projective transformation from one image in the sequence to another image in the sequence, wherein said generating comprises:
      estimating at least one Euclidean reconstruction at each of two or more focal lengths according to the set of inter-image homographies, wherein each Euclidean reconstruction comprises camera motion and camera intrinsic parameters at each frame of the image sequence and a plane normal for the image sequence; and
      selecting one of the Euclidean reconstructions that best fits the set of inter-image homographies as the Euclidean reconstruction for the image sequence.

2. The method as recited in claim 1, wherein the camera motion includes rotation and translation, and wherein the camera intrinsic parameters include focal length.

3. The method as recited in claim 1, wherein said estimating at least one Euclidean reconstruction at each of the two or more focal lengths according to the set of inter-image homographies comprises, for each of the two or more focal lengths:
   solving for a plane normal at the focal length according to the set of inter-image homographies, wherein said solving generates two solutions for the plane normal; and
   estimating a Euclidean reconstruction for each solution to the plane normal at the focal length.

4. The method as recited in claim 3, wherein said estimating a Euclidean reconstruction for each solution to the plane normal at the focal length comprises, for each solution for the plane normal:
   estimating camera motion for the frames according to the solution for the plane normal and the focal length;
   refining the estimated camera motion, the focal length, and the plane normal across all the frames to generate a Euclidean reconstruction for the solution for the plane normal at the focal length; and
   calculating a score for the Euclidean reconstruction according to how well the reconstruction fits the set of inter-image homographies.

5. The method as recited in claim 4, wherein said refining is performed according to a non-linear least-squares technique.

6. The method as recited in claim 1, wherein said estimating at least one Euclidean reconstruction at each of the two or more focal lengths according to the set of inter-image homographies comprises:
   partitioning the image sequence into a plurality of segments each comprising at least two consecutive frames; and
   for each of the two or more focal lengths:
      solving for a plane normal at the focal length for a first segment of the image sequence according to the respective inter-image homographies, wherein said solving generates two solutions for the plane normal at the first segment; and
      estimating a Euclidean reconstruction for each solution for the plane normal at the first segment, wherein said estimating comprises:
         estimating camera motion for the first segment according to the solution for the plane normal and the focal length and refining the estimated camera motions, the focal length, and the plane normal for the first segment; and
         for each subsequent segment, estimating camera motion for the segment according to the refined focal length at the previous segment and refining the estimated camera motion, focal length, and plane normal for the segment.

7. The method as recited in claim 1, wherein said estimating at least one Euclidean reconstruction at each of the two or more focal lengths according to the set of inter-image homographies comprises, for at least two combinations of a focal length at a first frame and a focal length at a last frame in the video sequence:
   solving for a plane normal according to the set of inter-image homographies and the combination of focal lengths at the first frame and the last frame, wherein said solving generates two solutions for the plane normal; and
   for each solution for the plane normal:
      estimating focal length at each of the frames between the first frame and the last frame according to the set of inter-image homographies;
      estimating camera motion for the frames according to the estimated focal lengths;

refining the estimated camera motion, the focal length, and the plane normal across all the frames to generate a Euclidean reconstruction for the solution to the plane normal; and calculating a score for the Euclidean reconstruction according to how well the reconstruction fits the set of inter-image homographies.

8. A system, comprising:
at least one processor; and
a memory comprising program instructions, wherein the program instructions are executable by at least one of the one or more processors to generate a Euclidean reconstruction for an image sequence comprising a plurality of frames according to a set of inter-image homographies estimated from point correspondences of structures in an entire scene for the image sequence, wherein each inter-image homography represents a projective transformation from one image in the sequence to another image in the sequence, wherein to generate the Euclidean reconstruction for the image sequence, the program instructions are executable by the at least one processor to:
estimate at least one Euclidean reconstruction at each of two or more focal lengths according to the set of inter-image homographies, wherein each Euclidean reconstruction comprises camera motion and camera intrinsic parameters at each frame of the image sequence and a plane normal for the image sequence; and
select one of the Euclidean reconstructions that best fits the set of inter-image homographies as the Euclidean reconstruction for the image sequence.

9. The system as recited in claim 8, wherein the camera motion includes rotation and translation, and wherein the camera intrinsic parameters include focal length.

10. The system as recited in claim 8, wherein, to estimate at least one Euclidean reconstruction at each of the two or more focal lengths according to the set of inter-image homographies, the program instructions are executable by the at least one processor to, for each of the two or more focal lengths:
solve for a plane normal at the focal length according to the set of inter-image homographies, wherein said solving generates two solutions for the plane normal; and estimate a Euclidean reconstruction for each solution to the plane normal at the focal length.

11. The system as recited in claim 10, wherein, to estimate a Euclidean reconstruction for each solution to the plane normal at the focal length, the program instructions are executable by the at least one processor to, for each solution for the plane normal:
estimate camera motion for the frames according to the solution for the plane normal and the focal length;
refine the estimated camera motion, the focal length, and the plane normal across all the frames to generate a Euclidean reconstruction for the solution for the plane normal at the focal length; and
calculate a score for the Euclidean reconstruction according to how well the reconstruction fits the set of inter-image homographies.

12. The system as recited in claim 11, wherein said refining is performed according to a non-linear least-squares technique.

13. The system as recited in claim 8, wherein, to estimate at least one Euclidean reconstruction at each of the two or more focal lengths according to the set of inter-image homographies, the program instructions are executable by the at least one processor to:

partition the image sequence into a plurality of segments each comprising at least two consecutive frames; and
for each of the two or more focal lengths:
solve for a plane normal at the focal length for a first segment of the image sequence according to the respective inter-image homographies, wherein said solving generates two solutions for the plane normal at the first segment; and
estimate a Euclidean reconstruction for each solution for the plane normal at the first segment, wherein, to estimate the Euclidean reconstruction for the solution, the program instructions are executable by the at least one processor to:
estimate camera motion for the first segment according to the solution for the plane normal and the focal length and refining the estimated camera motions, the focal length, and the plane normal for the first segment; and
for each subsequent segment, estimate camera motion for the segment according to the refined focal length at the previous segment and refine the estimated camera motion, focal length, and plane normal for the segment.

14. The system as recited in claim 8, wherein, to estimate at least one Euclidean reconstruction at each of the two or more focal lengths according to the set of inter-image homographies, the program instructions are executable by the at least one processor to, for at least two combinations of a focal length at a first frame and a focal length at a last frame in the video sequence:
solve for a plane normal according to the set of inter-image homographies and the combination of focal lengths at the first frame and the last frame, wherein said solving generates two solutions for the plane normal; and
for each solution for the plane normal:
estimate focal length at each of the frames between the first frame and the last frame according to the set of inter-image homographies;
estimate camera motion for the frames according to the estimated focal lengths;
refining the estimated camera motion, the focal length, and the plane normal across all the frames to generate a Euclidean reconstruction for the solution to the plane normal; and
calculate a score for the Euclidean reconstruction according to how well the reconstruction fits the set of inter-image homographies.

15. A non-transitory computer-readable storage medium storing program instructions, wherein the program instructions are computer-executable to implement:
generating a Euclidean reconstruction for an image sequence comprising a plurality of frames according to a set of inter-image homographies estimated from point correspondences of structures in an entire scene for the image sequence, wherein each inter-image homography represents a projective transformation from one image in the sequence to another image in the sequence, wherein said generating comprises:
estimating at least one Euclidean reconstruction at each of two or more focal lengths according to the set of inter-image homographies, wherein each Euclidean reconstruction comprises camera motion and camera intrinsic parameters at each frame of the image sequence and a plane normal for the image sequence; and selecting one of the Euclidean reconstructions that best fits the set of inter-image homographies as the Euclidean reconstruction for the image sequence.

16. The non-transitory computer-readable storage medium as recited in claim 15, wherein the camera motion includes rotation and translation, and wherein the camera intrinsic parameters include focal length.

17. The non-transitory computer-readable storage medium as recited in claim 15, wherein, in said estimating at least one Euclidean reconstruction at each of the two or more focal lengths according to the set of inter-image homographies, the program instructions are computer-executable to implement, for each of the two or more focal lengths:
solving for a plane normal at the focal length according to the set of inter-image homographies, wherein said solving generates two solutions for the plane normal; and
estimating a Euclidean reconstruction for each solution to the plane normal at the focal length.

18. The non-transitory computer-readable storage medium as recited in claim 17, wherein, in said estimating a Euclidean reconstruction for each solution to the plane normal at the focal length, the program instructions are computer-executable to implement, for each solution for the plane normal:
estimating camera motion for the frames according to the solution for the plane normal and the focal length;
refining the estimated camera motion, the focal length, and the plane normal across all the frames to generate a Euclidean reconstruction for the solution for the plane normal at the focal length; and
calculating a score for the Euclidean reconstruction according to how well the reconstruction fits the set of inter-image homographies.

19. The non-transitory computer-readable storage medium as recited in claim 15, wherein, in said estimating at least one Euclidean reconstruction at each of the two or more focal lengths according to the set of inter-image homographies, the program instructions are computer-executable to implement:
partitioning the image sequence into a plurality of segments each comprising at least two consecutive frames; and
for each of the two or more focal lengths:
solving for a plane normal at the focal length for a first segment of the image sequence according to the respective inter-image homographies, wherein said solving generates two solutions for the plane normal at the first segment; and
estimating a Euclidean reconstruction for each solution for the plane normal at the first segment, wherein said estimating comprises:
estimating camera motion for the first segment according to the solution for the plane normal and the focal length and refining the estimated camera motions, the focal length, and the plane normal for the first segment; and
for each subsequent segment, estimating camera motion for the segment according to the refined focal length at the previous segment and refining the estimated camera motion, focal length, and plane normal for the segment.

20. The non-transitory computer-readable storage medium as recited in claim 15, wherein, in said estimating at least one Euclidean reconstruction at each of the two or more focal lengths according to the set of inter-image homographies, the program instructions are computer-executable to implement, for at least two combinations of a focal length at a first frame and a focal length at a last frame in the video sequence:
solving for a plane normal according to the set of inter-image homographies and the combination of focal lengths at the first frame and the last frame, wherein said solving generates two solutions for the plane normal; and
for each solution for the plane normal:
estimating focal length at each of the frames between the first frame and the last frame according to the set of inter-image homographies;
estimating camera motion for the frames according to the estimated focal lengths;
refining the estimated camera motion, the focal length, and the plane normal across all the frames to generate a Euclidean reconstruction for the solution to the plane normal; and
calculating a score for the Euclidean reconstruction according to how well the reconstruction fits the set of inter-image homographies.

* * * * *